US012719759B2

(12) United States Patent
Báder et al.

(10) Patent No.: US 12,719,759 B2
(45) Date of Patent: Aug. 25, 2026

(54) ANALYTICS GENERATION IN A COMMUNICATION NETWORK

(71) Applicant: Telefonaktiebolaget LM Ericsson (publ), Stockholm (SE)

(72) Inventors: Attila Báder, Paty (HU); Peter Schvarcz-Fekete, Budapest (HU); Gergely Dévai, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 284 days.

(21) Appl. No.: 18/707,376

(22) PCT Filed: Nov. 8, 2021

(86) PCT No.: PCT/IB2021/060331
§ 371 (c)(1),
(2) Date: May 3, 2024

(87) PCT Pub. No.: WO2023/079354
PCT Pub. Date: May 11, 2023

(65) Prior Publication Data

US 2025/0030607 A1 Jan. 23, 2025

(51) Int. Cl.

| | |
|---|---|
| ***H04L 41/14*** | (2022.01) |
| ***H04W 24/08*** | (2009.01) |
| ***H04W 76/12*** | (2018.01) |

(52) U.S. Cl.
CPC ............ *H04L 41/14* (2013.01); *H04W 24/08* (2013.01); *H04W 76/12* (2018.02)

(58) Field of Classification Search
CPC . H04L 41/14; H04L 41/5067; H04L 43/0829; H04L 43/087; H04L 43/022;
(Continued)

(56) References Cited

U.S. PATENT DOCUMENTS

| | | | | |
|---|---|---|---|---|
| 10,965,654 | B2 * | 3/2021 | Munro | H04L 47/2483 |
| 11,743,198 | B1 * | 8/2023 | Smith | H04W 12/03 370/235 |

(Continued)

FOREIGN PATENT DOCUMENTS

| | | | | |
|---|---|---|---|---|
| CA | 3151141 C * | 1/2024 | | H04M 15/66 |
| EP | 3490289 A1 | 5/2019 | | |

(Continued)

OTHER PUBLICATIONS

International Search Report and Written Opinion dated Jul. 18, 2022 for International Application No. PCT/IB2021/060331 filed Nov. 8, 2021, consisting of 11 pages.

(Continued)

*Primary Examiner* — Mahendra R Patel
(74) *Attorney, Agent, or Firm* — Weisberg I.P. Law, P.A.

(57) ABSTRACT

A network node is configured for use in a communication network. The network node determines whether or not user plane traffic for a subscription to the communication network is to be processed for generating analytics. The network node then allocates a tunnel endpoint identifier, to identify an endpoint of a tunnel through which the user plane traffic for the subscription is to be communicated, based on whether or not the user plane traffic for the subscription is to be processed for generating analytics according to the determination.

12 Claims, 15 Drawing Sheets

(58) Field of Classification Search
CPC .. H04L 43/0852; H04L 43/028; H04W 24/08; H04W 76/12
USPC .......................................................... 370/329
See application file for complete search history.

(56) References Cited

U.S. PATENT DOCUMENTS

| | | | | |
|---|---|---|---|---|
| 11,800,394 | B2 * | 10/2023 | Han | H04W 28/0236 |
| 2016/0204996 | A1 * | 7/2016 | Lindgren et al. | H04L 43/20 709/224 |
| 2019/0174449 | A1 * | 6/2019 | Shan | H04W 60/04 |
| 2021/0144590 | A1 * | 5/2021 | Li et al. | H04W 28/0975 |
| 2022/0408445 | A1 * | 12/2022 | Sun | H04B 7/0486 |
| 2024/0171484 | A1 * | 5/2024 | Muñoz De La Torre Alonso | H04L 43/062 |

FOREIGN PATENT DOCUMENTS

| | | | | |
|---|---|---|---|---|
| WO | WO-2009049644 | A1 * | 4/2009 | H04L 43/028 |
| WO | WO-2018001522 | A1 * | 1/2018 | H04L 45/38 |
| WO | 2021186221 | A1 | 9/2021 | |

OTHER PUBLICATIONS

3GPP TS 29.244 V17.2.0; 3rd Generation Partnership Project; Technical Specification Group Core Network and Terminals; Interface between the Control Plane and the User Plane Nodes; Stage 3 (Release 17); Sep. 2021, consisting of 356 pages.

* cited by examiner

FIG. 6

ANALYTICS GENERATION IN A COMMUNICATION NETWORK

CROSS-REFERENCE TO RELATED APPLICATION

This application is a Submission Under 35 U.S.C. § 371 for U.S. National Stage Patent Application of International Application Number: PCT/IB2021/060331, filed Nov. 8, 2021 entitled "ANALYTICS GENERATION IN A COMMUNICATION NETWORK," the entirety of which is incorporated herein by reference.

The present application relates generally to a communication network, and relates more particularly to analytics generation in such a network.

BACKGROUND

In the context of a communication network, analytics provide insight into various aspects of the network's operation, from network performance and load to subscriber-level service experience and radio environment. Analytics may characterize these aspects in terms of statistical information that describes past observations and/or in terms of predictive information. Depending on the level of analytics sophistication, a communication network operator can use analytics for identifying node or network failures, session-based troubleshooting of those failures, identifying end-to-end user-perceived service quality issues, or the like.

Generating analytics in a communication network involves analyzing user plane traffic. The large volume of such traffic proves difficult to comprehensively analyze, though. Indeed, comprehensive analysis of user plane traffic would require that several terra-bits of traffic be analyzed per core network site, in real-time, demanding large swaths of processing, memory, and storage resources that can only be met by a large number of servers or virtual CPUs. This challenge will grow as the amount of user plane traffic increases with the number of service types and wireless communication devices, e.g., with the introduction of 5G.

Some approaches to data analytics reduce the volume of user plane traffic that must be analyzed for generating analytics, so as to reduce hardware resource requirements. For example, one approach generates analytics from random samples of user plane traffic. Another approach, described in International Patent Application Publication WO2021186221A1, generates analytics from intelligently filtered user plane traffic, e.g., for analyzing only the user plane traffic for a selected subset of subscribers, such as a subset that is estimated to cover the geographical area of the network in a statistically reliable way.

Challenges nonetheless still exist in generating analytics from selectively sampled or filtered user plane traffic. Because a user plane packet does not itself identify to which subscriber the packet relates, sampling or filtering user plane packets on a per subscriber basis heretofore requires correlating each packet with the control plane in order to determine to which subscribers the packet relates. Processing each packet and correlating the control and user planes in this way still requires considerable hardware resources. Moreover, in approaches that filter user plane packets according to a subscriber whitelist, the high processing overhead limits the number of subscribers that can be on the whitelist as a practical matter, thereby limiting the uses cases for the resulting analytics.

SUMMARY

Some embodiments herein exploit tunnel endpoint identifiers for implicitly identifying what user plane traffic is to be processed for analytics generation in a communication network. Some embodiments, for example, divide the tunnel endpoint identifier space into different subsets, one subset including identifiers for identifying endpoints of tunnels through which is communicated user plane traffic that is to be processed for analytics generation, and one subset including identifiers for identifying endpoints of tunnels through which is communicated user plane traffic that is not to be processed for analytics generation. In these and other embodiments, then, a network node can determine whether user plane traffic is to be processed for analytics generation simply based on the tunnel endpoint identifier used to communicate that traffic, e.g., without having to correlate the user plane with the control plane. Exploiting tunnel endpoint identifiers in this way thereby advantageously improves the efficiency with which user plane traffic can be selectively sampled, filtered, or otherwise probed for analytics generation. Some embodiments accordingly reduce the hardware resource demands for analytics generation, increase the volume of user plane traffic that can be analyzed, increase the number of subscribers whitelisted for analytics generation, and/or expand the use cases for analytics generation in a communication network.

More particularly, embodiments herein include a method performed by a network node in a communication network. The method comprises determining whether or not user plane traffic for a subscription to the communication network is to be processed for generating analytics, and allocating a tunnel endpoint identifier to identify an endpoint of a tunnel through which the user plane traffic for the subscription is to be communicated, based on whether or not the user plane traffic for the subscription is to be processed for generating analytics according to said determining.

In some embodiments, allocating a tunnel endpoint identifier comprises allocating the tunnel endpoint identifier from a first subset of tunnel endpoint identifiers or a second subset of tunnel endpoint identifiers, depending respectively on whether or not the user plane traffic for the subscription is to be processed for generating analytics. In this case, the first subset of tunnel endpoint identifiers is dedicated for user plane traffic that is to be processed for generating analytics, and the second subset of tunnel endpoint identifiers is dedicated for user plane traffic that is not to be processed for generating analytics.

In some embodiments, the method further comprises receiving a list of one or more subscription identifiers identifying one or more subscriptions whose user plane traffic is to be processed for generating analytics, and said determining comprises determining whether or not a subscription identifier identifying the subscription is included in the received list.

In some embodiments, the network node implements a session management function, SMF, or a user plane function, UPF.

In some embodiments, the tunnel endpoint identifier is a first tunnel endpoint identifier that identifies an endpoint of a first tunnel through which the user plane traffic for the subscription is to be communicated in a first direction. In this case, the method further comprises receiving a second tunnel endpoint identifier that identifies an endpoint of a second tunnel through which the user plane traffic for the subscription is to be communicated in a second direction, and said determining comprises determining whether or not user plane traffic for the subscription to the communication network is to be processed for generating analytics depending respectively on whether or not the second tunnel endpoint identifier is included in a subset of tunnel endpoint identifiers dedicated for user plane traffic that is to be processed for generating analytics. In one or more of these embodiments, the network node is an access network node in an access network of the communication network.

In some embodiments, the tunnel has one endpoint at a core network node of the communication network and one endpoint at an access network node of the communication network. In one or more of these embodiments, the network node is either the core network node or the access network node.

In some embodiments, the tunnel is a General Packet Radio Service, GPRS, Tunnelling Protocol, GTP, user plane tunnel.

In some embodiments, the method further comprises transmitting, as part of a procedure for establishing or modifying a user plane session for the user plane traffic, a message that indicates the allocated tunnel endpoint identifier.

In some embodiments, the analytics characterize service quality and/or network quality on a subscription level. Additionally or alternatively, the analytics are based on collection and correlation of elementary network events from different network domains.

Other embodiments herein include a method performed by a network node in a communication network. The method comprises receiving user plane traffic through a tunnel that has an endpoint at the network node, and determining, based on a tunnel endpoint identifier that identifies the endpoint of the tunnel through which the user plane traffic is received, whether or not the user plane traffic is to be processed for generating analytics. The method also comprises probing or not probing the user plane traffic to be processed for generating analytics, depending on whether or not the user plane traffic is or is not to be processed for generating analytics according to said determining.

In some embodiments, said determining comprises determining that the user plane traffic is or is not to be processed for generating analytics depending respectively on whether the tunnel endpoint identifier is included in a first subset of tunnel endpoint identifiers or a second subset of tunnel endpoint identifiers. In this case, the first subset of tunnel endpoint identifiers is dedicated for user plane traffic that is to be processed for generating analytics, and the second subset of tunnel endpoint identifiers is dedicated for user plane traffic that is not to be processed for generating analytics.

In some embodiments, said determining comprises applying a mask to the tunnel endpoint identifier, and determining, based on whether or not the tunnel endpoint identifier matches the mask, whether or not the user plane traffic is to be processed for generating analytics.

In some embodiments, the network node implements, or is co-located with, a user plane function, UPF.

In some embodiments, the tunnel has another endpoint at an access network node of the communication network.

In some embodiments, the tunnel is a General Packet Radio Service, GPRS, Tunnelling Protocol, GTP, user plane tunnel.

In some embodiments, the method further comprises providing probed user plane traffic to an analytics system configured to generate the analytics.

In some embodiments, the analytics characterize service quality and/or network quality on a subscription level. Additionally or alternatively, the analytics are based on collection and correlation of elementary network events from different network domains.

Other embodiments herein include a network node configured for use in a communication network. The network node is configured to determine whether or not user plane traffic for a subscription to the communication network is to be processed for generating analytics, and allocate a tunnel endpoint identifier to identify an endpoint of a tunnel through which the user plane traffic for the subscription is to be communicated, based on whether or not the user plane traffic for the subscription is to be processed for generating analytics according to said determining.

In some embodiments, the network node is configured to perform the steps described above for a network node.

Other embodiments herein include a network node configured for use in a communication network. The network node is configured to receive user plane traffic through a tunnel that has an endpoint at the network node, and determine, based on a tunnel endpoint identifier that identifies the endpoint of the tunnel through which the user plane traffic is received, whether or not the user plane traffic is to be processed for generating analytics. The network node is also configured to probe or not probe the user plane traffic to be processed for generating analytics, depending on whether or not the user plane traffic is or is not to be processed for generating analytics according to said determining.

In some embodiments, the network node is configured to perform the steps described above for a network node.

Other embodiments herein include a computer program comprising instructions which, when executed by at least one processor of a network node, causes the network node to perform the steps described above for a network node.

In some embodiments, a carrier containing the computer program is one of an electronic signal, optical signal, radio signal, or computer readable storage medium.

Other embodiments herein include a network node configured for use in a communication network. The network node comprises communication circuitry and processing circuitry. The processing circuitry is configured to determine whether or not user plane traffic for a subscription to the communication network is to be processed for generating analytics, and allocate a tunnel endpoint identifier to identify an endpoint of a tunnel through which the user plane traffic for the subscription is to be communicated, based on whether or not the user plane traffic for the subscription is to be processed for generating analytics according to said determining.

In some embodiments, the processing circuitry is configured to perform the steps described above for a network node.

Other embodiments herein include a network node configured for use in a communication network. The network node comprises communication circuitry and processing circuitry. The processing circuitry is configured to receive user plane traffic through a tunnel that has an endpoint at the network node, and determine, based on a tunnel endpoint identifier that identifies the endpoint of the tunnel through which the user plane traffic is received, whether or not the user plane traffic is to be processed for generating analytics. The processing circuitry is also configured to probe or not probe the user plane traffic to be processed for generating analytics, depending on whether or not the user plane traffic is or is not to be processed for generating analytics according to said determining.

In some embodiments, the processing circuitry is configured to perform the steps described above for a network node.

BRIEF DESCRIPTION OF THE DRAWINGS

FIG. 6 is a logic flow diagram of a method performed by a network node according to some embodiments.

DETAILED DESCRIPTION

Figure 1:
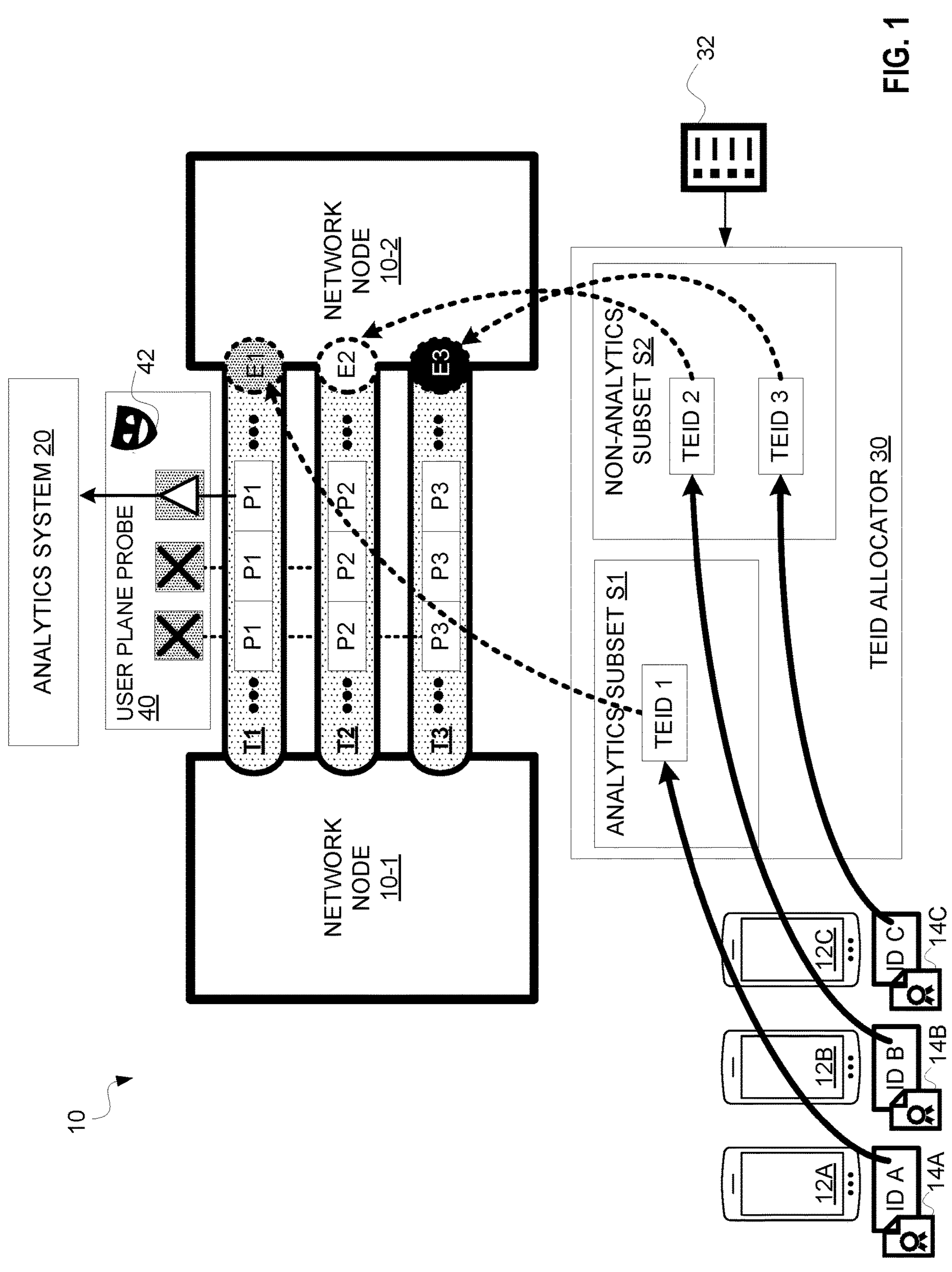
FIG. 1 is a block diagram of a communication system according to some embodiments.

FIG. 1 shows a communication network 10 configured to provide communication service to communication devices, e.g., communication devices 12A, 12B, and 12C. The communication network 10 may for instance be a wireless communication network, such as a 5G wireless communication network, in which case the communication devices 12A, 12B, and 12C may be wireless communication devices. Regardless, the communication network 10 may provide communication service to the communication devices 12A, 12B, and 12C on the basis of respective subscriptions 14A, 14B, and 14C to the communication network 10, e.g., as identified by respective subscription identifiers ID A. ID B, and ID C.

The communication network 10 as shown includes network nodes 10-1 and 10-2 for providing communication service to communication devices. The network nodes 10-1, 10-2 in particular are each in a path via which user plane (UP) traffic for the communication devices is communicated. User plane traffic herein refers to traffic in a user plane of the communication network 10, where the user plane contains protocols responsible for transporting the traffic, as opposed to the control plane which contains protocols responsible for controlling how the traffic is transported.

FIG. 1 in this regard shows that user plane traffic is communicated between the network nodes 10-1, 10-2 via one or more tunnels, exemplified as tunnels T1, T2, and T3. The one or more tunnels may for instance be one or more General Packet Radio Service (GPRS) Tunnelling Protocol (GTP) user plane tunnels. In any event the user plane traffic for each communication device may be packetized into one or more user plane packets. In these and other embodiments, the user plane traffic for each subscription is communicated through a respective tunnel, which may for instance be dedicated for communicating user plane traffic for that subscription. FIG. 1 for example shows that user plane traffic for subscription 14A (in the form of user plane packets P1) is communicated through tunnel T1, user plane traffic for subscription 14B (in the form of user plane packets P2) is communicated through tunnel T2, and user plane traffic for subscription 14C (in the form of user plane packets P3) is communicated through tunnel T3.

FIG. 1 also shows an analytics system 20 for the communication network 10. The analytics system 20 may for example be implemented by one or more instances of a Network Data Analytics Function (NWDAF), one or more instances of an application function (AF), or some combination thereof. In one embodiment, the analytics system 20 is implemented in an Operations Support System (OSS) for the communication network 10. Regardless, the analytics system 20 generates analytics based on analysis of the user plane traffic communicated between the network nodes 10-1, 10-2. The user plane traffic is thereby effectively 'monitored' by the analytics system 20, as opposed to just being transparently forwarded between the network nodes 10-1, 10-2, for the purpose of analytics generation. The analytics generated by the analytics system 20 characterize patterns and/or other meaningful information gathered from analysis of the user plane traffic. For example, the analytics may characterize service quality and/or network quality on a subscription level, e.g., in the form of a quality of experience (QoE) metric, a mean opinion score (MOS), service setup time, service access time, service success rate, and/or packet-level quality of service (QOS) metric(s) such as packet loss, delay jitter, or burst parameters. Alternatively or additionally, the analytics may be based on collection and correlation of elementary network events from different network domains.

In this context, some embodiments herein facilitate the generation of analytics from the user plane traffic for a selected subset of subscriptions, e.g., as a way to reduce the volume of user plane traffic analyzed and corresponding hardware resource requirements for analytics generation as compared to analytics generation from all user plane traffic. The subset of subscriptions whose user plane traffic is to be analyzed may for instance be selected randomly or be chosen intelligently, e.g., to include subscriptions representing the communication network's coverage area in a statistically reliable way. User plane probe 40 may then probe the user plane traffic for this subset of subscriptions, e.g., for analyzing or forwarding a copied version of the user plane traffic to the analytics system 20. Probing the user plane traffic may involve processing the user plane traffic to some extent, e.g., for either analyzing and then forwarding to the analytics system 20 or for duplicating and forwarding the duplicated traffic to the analytics system 20.

No matter how the subset of subscriptions for analytics generation is determined, FIG. 1 shows as an example that the analytics system 20 generates analytics selectively from the user plane traffic for subscription 14A, to the exclusion of user plane traffic for subscriptions 14B and 14C. Indeed, FIG. 1 in this regard shows that the analytics system 20 generates analytics from the user plane packets P1 communicated through tunnel T1, but does not generate analytics from the user plane packets P2 or P3 communicated through tunnels T2 and T3.

In at least some embodiments, though, the user plane packets P1, P2, P3 do not include any information (e.g., in the packet headers) that directly identifies the subscription for which the user plane packets are respectively communicated. The user plane packets P1, P2, and P3 for example do not include the subscription identifiers ID A, ID B, and ID C for identifying the packets as relating to respective subscriptions 14A, 14B, and 14C. Heretofore, then, it would be necessary to correlate the user plane packets P1, P2, P3 with the control plane in order to decipher for which subscription each user plane packet is communicated.

Some embodiments herein advantageously exploit identifiers that identify the endpoints of tunnels T1, T2, T3 between the network nodes 10-1, 10-2 for implicitly identifying what user plane traffic is to be processed for analytics generation. In these embodiments, the determination of whether user plane traffic is to be processed for analytics generation may be made simply based on the tunnel endpoint identifier used to communicate that traffic, e.g., without having to correlate the user plane with the control plane. Exploiting tunnel endpoint identifiers in this way thereby advantageously improves the efficiency with which user plane traffic can be selectively sampled, filtered, or otherwise probed for analytics generation. Some embodiments accordingly reduce the hardware resource demands for analytics generation, increase the volume of user plane traffic that can be analyzed, increase the number of subscriptions whitelisted for analytics generation, and/or expand the use cases for analytics generation in the communication network 10.

More particularly, FIG. 1 shows a tunnel endpoint identifier (TEID) allocator 30 that allocates TEIDs to tunnel endpoints in a way that implicitly identifies what user plane traffic is to be processed for analytics generation. The TEID allocator 30 in this regard allocates a TEID, to identify an endpoint of a tunnel through which the user plane traffic for a subscription is to be communicated, based on whether or not the user plane traffic for the subscription is to be processed for generating analytics.

The TEID allocator 30 in some embodiments does so based on dividing the TEID space, from which the TEID allocator 30 allocates TEIDs, into different subsets. One subset S1, referred to as the analytics subset S1, is dedicated for identifying endpoints of tunnels through which is communicated user plane traffic that is to be processed for analytics generation. Another subset, referred to as non-analytics subset S2, is dedicated for identifying endpoints of tunnels through which is communicated user plane traffic that is not to be processed for analytics generation. In the example of FIG. 1, then, the TEID allocator 30 allocates a TEID from the analytics subset S1, shown as TEID 1, for identifying an endpoint E1 of tunnel T1 through which is communicated user plane packets P1 that are to be processed for analytics generation. Similarly, the TEID allocator 30 allocates TEIDs from the non-analytics subset S2, shown as TEIDs 2 and 3, for identifying endpoint E2, E3 of tunnels T2, T3 through which is communicated user plane packets P2, P3 that are not to be processed for analytics generation. In one embodiment, the subsets S1, S2 are preconfigured as fixed ranges of TEIDs. In another embodiment, by contrast, the subsets S1, S2 are configurable throughout the communication network via network-wide configuration parameter(s). Either way, the subsets S1, S2 are known by all relevant network nodes.

In some embodiments, the TEIDs which implicitly identify what user plane traffic is to be processed for analytics generation are fully qualified TEIDs so as to be globally unique across network nodes. In these embodiments, then, the TEIDs may be referred to as F-TEIDs, which stands for fully qualified TEIDs, where each F-TEID comprises the combination of a non-fully qualified TEID and an Internet Protocol (IP) address of the network node at which the tunnel endpoint terminates. Here, the non-fully qualified TEID may be chosen arbitrarily by the network node in any manner, as long as the non-fully qualified TEID is unique amongst the other TEIDs chosen by the network node. In other embodiments, though, the TEIDs which implicitly identify what user plane traffic is to be processed for analytics generation are non-fully qualified TEIDs themselves, meaning that they are unique at least amongst the TEIDs generated by the network node at which the TEIDs terminate but need not be unique across network nodes.

In some embodiments, the TEID allocator 30 receives a list 32 of subscription identifier(s) identifying subscription (s) whose user plane traffic is to be processed for generating analytics, e.g., where subscription identifier(s) may be in the form of Subscription Permanent Identifier(s) (SUPIs). The list 32 may for example be referred to as a subscription whitelist. In this case, the TEID allocator 30 may determine whether or not user plane traffic for a subscription is to be processed for generating analytics by determining whether or not a subscription identifier identifying the subscription is included in the list 32. If the subscription identifier is included in the list 32, the user plane traffic for the corresponding subscription is to be processed for generating analytics, meaning that the TEID allocator 30 allocates a TEID from the analytics subset S1. On the other hand, if the subscription identifier is not included in the list 32, the user plane traffic for the corresponding subscription is not to be processed for generating analytics, meaning that the TEID allocator 30 allocates a TEID from the non-analytics subset S2.

With TEIDs allocated in this way, the user plane probe 40 may selectively probe user plane traffic, for analytics generation, based on TEIDs, e.g., without having to correlate the user plane with the control plane. Indeed, in some embodiments herein, each user plane packet P1, P2, P3 includes the TEID that identifies an endpoint E1, E2, or E3 of the respective tunnel T1, T2, or T3 through which the packet is communicated. This means that, in order to determine whether a user plane packet is to be processed for analytics generation, the user plane probe 40 need simply read the TIED included in that packet and determine whether the TEID belongs to the analytics subset S1 or the non-analytics subset S2. If the read TEID belongs to the analytics subset S1, the user plane probe 40 probes the user plane packet to be processed for generating analytics. If the read TEID belongs to the non-analytics subset S2, the user plane probe 40 does not probe the user plane packet. As described more fully later, in some embodiments, the user plane probe 40 applies a mask 42 to the TEID in order to determine whether the TEID belongs to the analytics subset S1 or the non-analytics subset S2, e.g., the TEID belongs to the analytics subset S1 if the TEID matches the mask 42. Using the mask 42 in this way, the determination of to which subset S1, S2 the TEID belongs may advantageously be performed in constant time, no matter how many TEIDs belong to the subsets S1, S2. Regardless, the user plane probe 40 generally probes or does not probe user plane traffic to be processed for generating analytics, based on the TEID that identifies the endpoint of the tunnel through which that user plane traffic is received, e.g., depending on whether the TEID is included in the analytics subset S1 or the non-analytics subset S2.

Note that, in one or more embodiments, one of the network nodes 10-1, 10-2 is deployed in an access network of the communication network 10 and the other of the network nodes 10-1, 10-2 is deployed in a core network of the communication network 10. In these and other embodiments, where the communication network 10 is a 5G network, whichever of the network nodes 10-1, 10-2 is in the AN 10A may be a gNodeB and the other of the network nodes 10-1. 10-2 in the CN 10B may implement a user plane function (UPF).

Figure 2A:
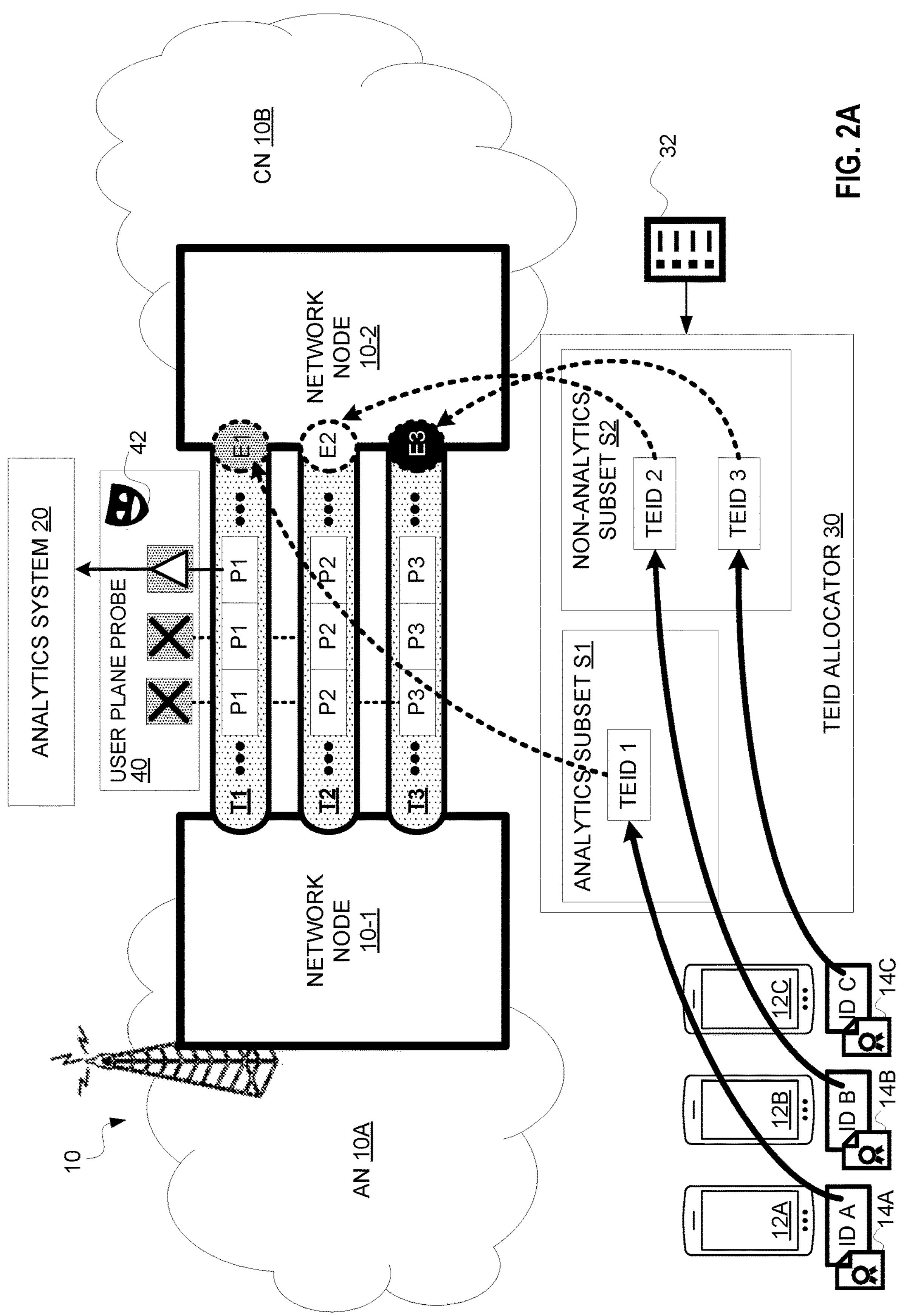
FIG. 2A is a block diagram of a communication network in one or more embodiments where relevant tunnel endpoints terminate in a network node in a core network.

FIG. 2A for example shows one embodiment where network node 10-1 is deployed in an access network (AN) 10A of the communication network 10 (e.g., in the form of a gNodeB) and network node 10-2 is deployed in a core network (CN) 10B of the communication network 10 (e.g., in the form of a UPF). In this case, the endpoints E1, E2, and E3 of the tunnels T1, T2, and T3 whose TEIDs 1, 2, and 3 implicitly identify which user plane traffic is to be processed for analytics generation are CN-side endpoints. In some embodiments, then, downlink user plane packets communicated from network node 10-2 towards network node 10-1 include the TEIDs 1, 2, and 3 of the CN-side tunnel endpoints, for use by the user plane probe 40 in deciding which downlink user plane packets to probe for analytics generation.

Figure 2B:
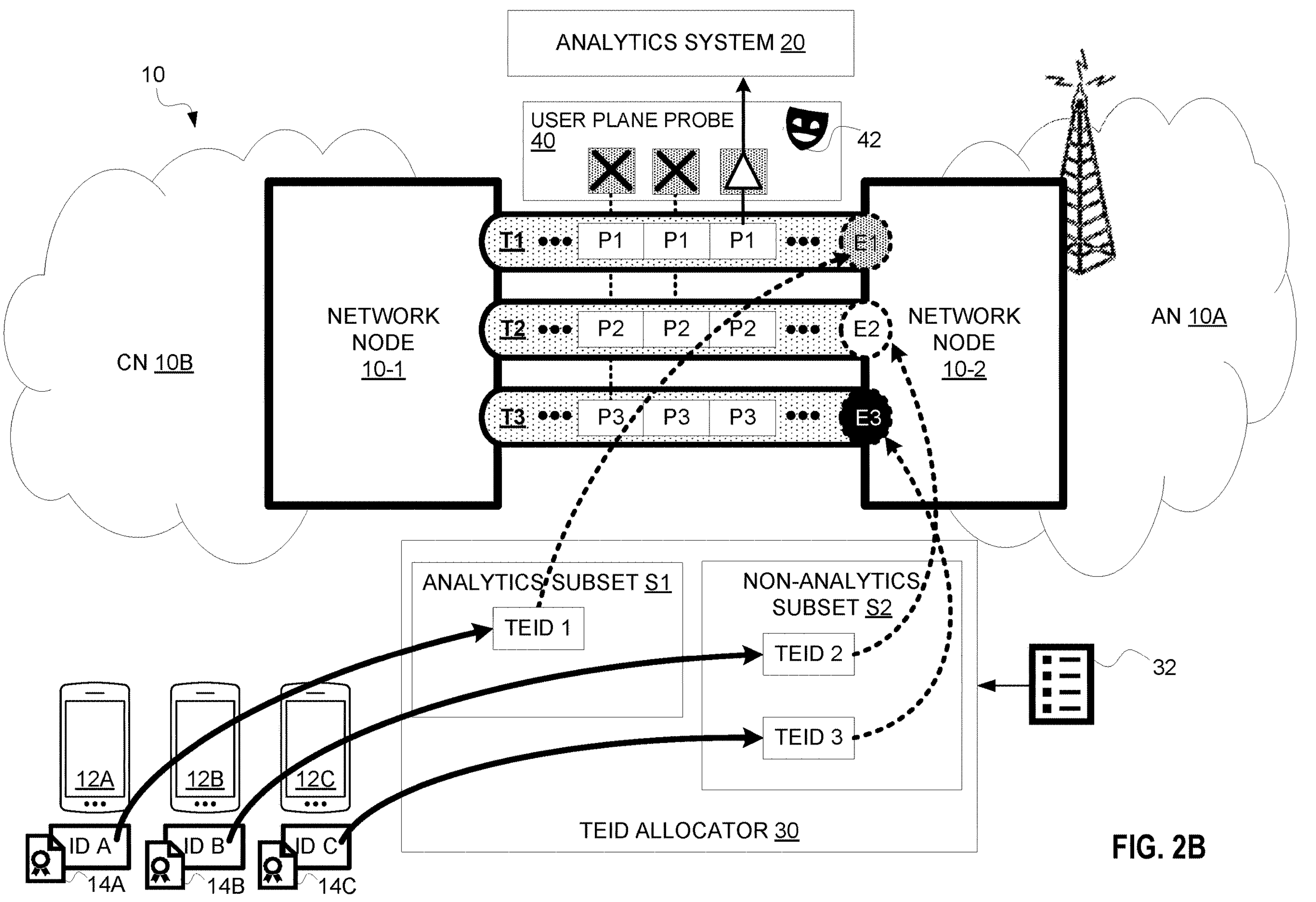
FIG. 2B is a block diagram of a communication network in one or more embodiments where relevant tunnel endpoints terminate in a network node in an access network.

As another example, FIG. 2B shows a different embodiment where network node 10-1 is deployed in the CN 10B of the communication network 10 (e.g., in the form of a UPF) and network node 10-2 is deployed in the AN 10A of the communication network 10 (e.g., in the form of a gNodeB). In this case, the endpoints E1, E2, and E3 of the tunnels T1, T2, and T3 whose TEIDs 1, 2, and 3 implicitly identify which user plane traffic is to be processed for analytics generation are AN-side endpoints. In some embodiments, then, uplink user plane packets communicated from network node 10-2 towards network node 10-1 include the TEIDs 1, 2, and 3 of the AN-side tunnel endpoints, for use by the user plane probe 40 in deciding which uplink user plane packets to probe for analytics generation.

As still another example, FIGS. 2A and 2B may be implemented in combination, e.g., for supporting analytic generation from user plane traffic in both the uplink direction and the downlink direction. In one embodiment, for instance, a TEID identifying a CN-side tunnel endpoint for a subscription is allocated by a network node in the CN 10B first, based on whether or not the downlink user plane traffic for the subscription is to be processed for analytics generation. The TEID identifying the CN-side tunnel endpoint for the subscription is then signaled to a network node in the AN 10A, which allocates a TEID, identifying an AN-side tunnel endpoint for the subscription, based on the TEID identifying the CN-side tunnel endpoint. In this regard, if the TEID identifying the CN-side tunnel endpoint belongs to a subset dedicated for analytics generation, then the network node in the AN 10A likewise allocates a TEID, for identifying the AN-side tunnel endpoint, from a subset dedicated for analytics generation (which may be the same or a different subset as that used for allocating the TEID identifying the CN-side tunnel endpoint). Conversely, if the TEID identifying the CN-side tunnel endpoint does not belong to a subset dedicated for analytics generation, then the network node in the AN 10A likewise allocates a TEID, for identifying the AN-side tunnel endpoint, from a subset that is not dedicated for analytics generation.

Note further that, in some embodiments, the user plane probe 40 may be implemented in network node 10-1, network node 10-2, any network node in the CN 10B of the communication network 10, or any network node in the communication path between network node 10-1 and network node 10-2. In one embodiment, for example, the tunnel endpoints E1, E2, and E3 terminate at a network node implementing a UPF and the user plane probe 40 is implemented by that same network node so as to be co-located with the UPF.

Note, too, that the TEID allocator 30 may be implemented by either network node 10-1, network node 10-2, or some other network node in the communication network 10. In some embodiments, for example, the TEID allocator 30 is implemented in the network node at which the tunnel endpoints E1, E2, and E3 terminate. For example, in one embodiment, the tunnel endpoints E1, E2, and E3 terminate at a network node implementing a UPF and the TEID allocator 30 is implemented by that same network node so as to be co-located with the UPF. As another example, in still another embodiment, the tunnel endpoints E1, E2, and E3 terminate at a network node implementing a gNodeB and the TIED allocator 30 is implemented by that same network node so as to be co-located with the gNodeB. In other embodiments, by contrast, the the TEID allocator 30 is implemented in a network node at which none of the tunnel endpoints E1, E2, and E3 terminate. For example, in one embodiment, the tunnel endpoints E1, E2, and E3 terminate at a network node implementing a UPF or a gNodeB, whereas the TEID allocator 30 is implemented at a network node comprising a Session Management Function (SMF).

Figure 3A:
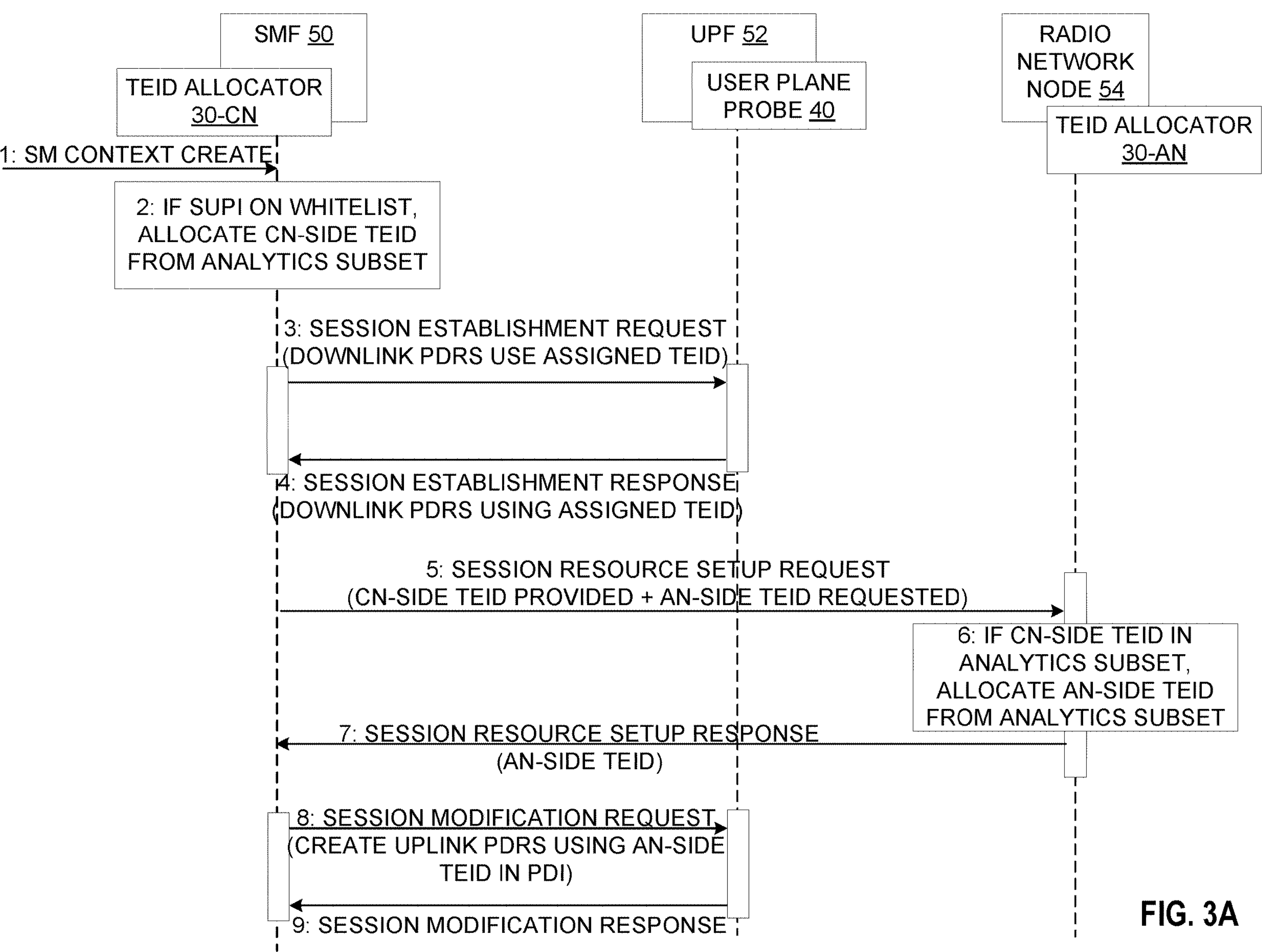
FIG. 3A is a call flow diagram for tunnel endpoint identifier allocation for downlink and uplink user plane traffic according to some embodiments where tunnel endpoint identifier allocation for downlink user plane traffic is performed by an SMF.
Figure 3B:
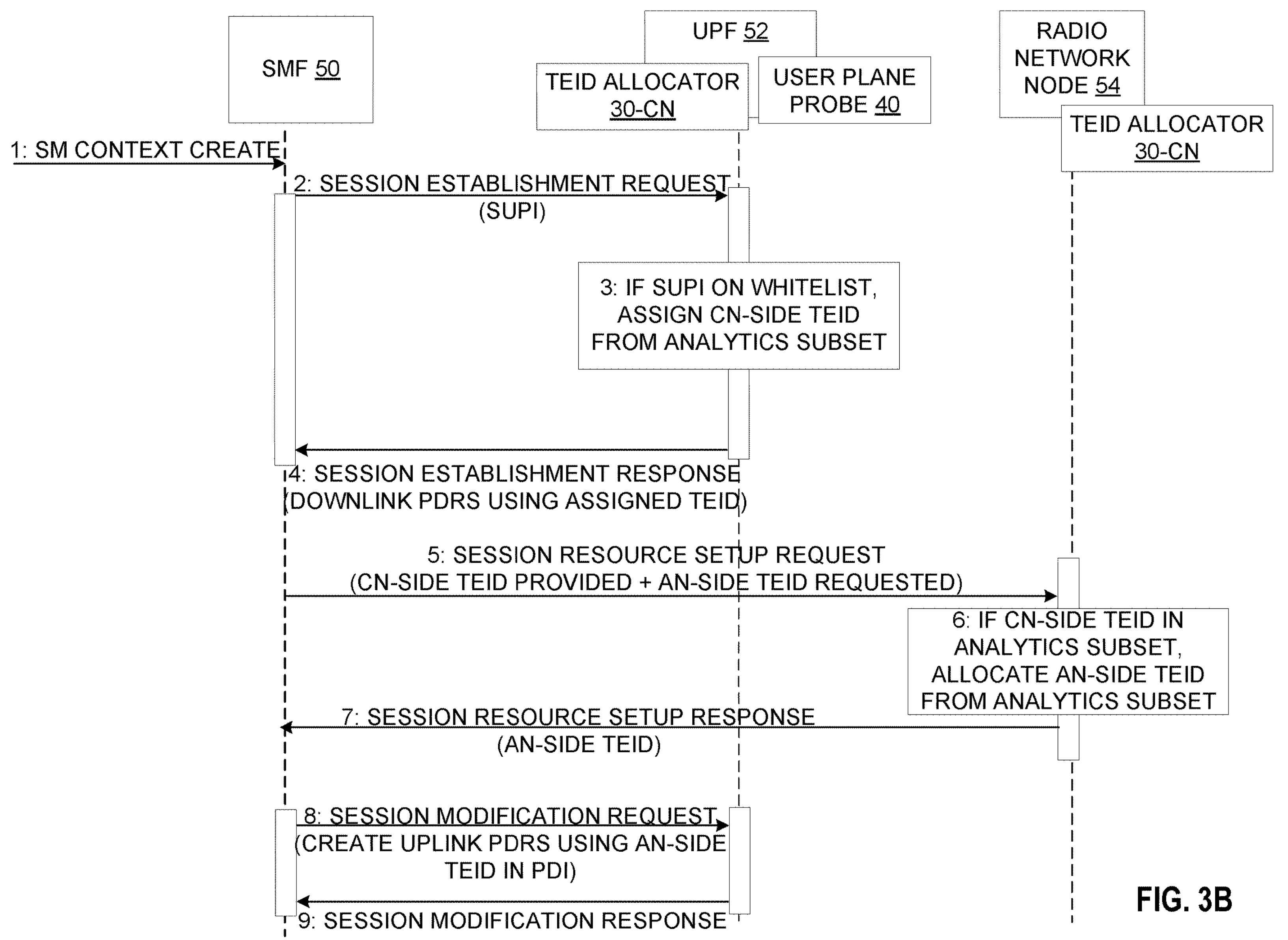
FIG. 3B is a call flow diagram for tunnel endpoint identifier allocation for downlink and uplink user plane traffic according to some embodiments where tunnel endpoint identifier allocation for downlink user plane traffic is performed by a UPF.

FIGS. 3A and 3B depict different embodiments in this regard, in a context where the communication network 10 is a 5G network. As shown in FIG. 3A, an SMF 50 in the communication network 10 receives a session management (SM) context create request message for a subscription identified by a SUPI included in the request (Step 1). Responsive to this request message, a TEID allocator 30-CN implemented by or co-located with the SMF 50 allocates a CN-side TEID for identifying a CN-side endpoint of a downlink tunnel through which downlink user plane traffic for the subscription is to be communicated (Step 2). The TEID allocator 30-CN in this regard allocates the CN-side TEID from either an analytics subset S1 or a non-analytics subset S2, depending respectively on whether or not the SUPI is included in a list 32 (for filtering) or partition (for sampling) of SUPIs identifying subscriptions whose user plane traffic is to be processed for generating analytics. The list 32 or partition may for instance be signaled from the analytics system 20 to the SMF 50. Regardless, the SMF 50 then transmits a session establishment request message to a UPF 52 requesting establishment of a user plane session for the subscription (Step 3). The session establishment request message indicates that downlink packet detection rules (PDRs) are to use the assigned CN-side TEID, for determining which user plane packets are to be probed for analytics generation. A user plane probe 40 co-located with the UPF 52 is correspondingly configured to selectively probe, for analytics generation, downlink user plane packets that include the assigned CN-side TEID. The UPF 52 then transmits a session establishment response indicating that downlink PDRs are using the assigned CN-side TEID (Step 4).

The SMF 50 next transmits a session resource setup request message to a radio network node 54 serving the subscription (Step 5). The session resource setup request message requests that the radio network node 54 allocate an AN-side TEID for identifying an AN-side endpoint of an uplink tunnel through which uplink user plane traffic for the subscription is to be communicated. The session resource setup request message also indicates the CN-side TEID identifying the CN-side endpoint of the downlink tunnel through which downlink user plane traffic for the subscription is to be communicated. In response to the setup request message, a TEID allocator 30-AN implemented at or co-located with the radio network node 54 allocates the AN-side TEID from either an analytics subset S1 or a non-analytics subset S2 (which may be the same as or different from the subsets used for identifying downlink tunnel endpoints), depending respectively on whether or not the CN-side TEID is included in the analytics subset S1 (Step 6). The radio network node 54 then transmits a session resource setup response message to the SMF 50 (Step 7). The session resource setup response message indicates the AN-side TEID. The SMF 50 next transmits a session modification request to the UPF 52 (Step 7). The session modification request message indicates that uplink packet detection rules (PDRs) are to be creating uses the assigned AN-side TEID, for determining which user plane packets are to be probed for analytics generation. A user plane probe 40 co-located with the UPF 52 is correspondingly configured to selectively probe, for analytics generation, uplink user plane packets that include the assigned AN-side TEID. The UPF 52 then transmits a session modification response indicating that uplink PDRs are using the assigned AN-side TEID (Step 9).

In the example of FIG. 3A, then, a TEID allocator 30-CN at the SMF 50 allocates the CN-side TEID for implicitly identifying downlink user plane traffic to be probed for analytics generation, and a TEID allocator 30-AN at the radio network node 54 allocates the AN-side TEID for implicitly identifying uplink user plane traffic to be probed for analytics generation. FIG. 3B by contrast locates the TEID allocator 30-N at the UPF 52 instead of the SMF 50. That is, FIG. 3B depicts embodiments where a TEID allocator 30-CN at the UPF 52 allocates the CN-side TEID for implicitly identifying downlink user plane traffic to be probed for analytics generation, and a TEID allocator 30-AN at the radio network node 54 allocates the AN-side TEID for implicitly identifying uplink user plane traffic to be probed for analytics generation.

More particularly in this regard, FIG. 3B shows that, in response to the SM context create request message (Step 1), the SMF 50 transmits a session establishment request message to the UPF 52 (Step 2), where the session establishment request message indicates the SUPI for the subscription, e.g., by including the USER ID optional information element (IE) in the request. A TEID allocator 30-CN implemented by or co-located with the UPF 52 allocates a CN-side TEID for identifying a CN-side endpoint of a downlink tunnel through which downlink user plane traffic for the subscription is to be communicated (Step 3). The TEID allocator 30-CN in this regard allocates the CN-side TEID from either an analytics subset S1 or a non-analytics subset S2, depending respectively on whether or not the indicated SUPI is included in a list 32 (for filtering) or partition (for sampling) of SUPIs identifying subscriptions whose user plane traffic is to be processed for generating analytics. The list 32 or partition may for instance be signaled from the analytics system 20 to the UPF 52. Regardless, the UPF 52 then transmits a session establishment response indicating that downlink PDRs are using the assigned CN-side TEID (Step 4). Steps 5-9 of FIG. 3B then proceed as described with respect to FIG. 3A.

Figure 4:
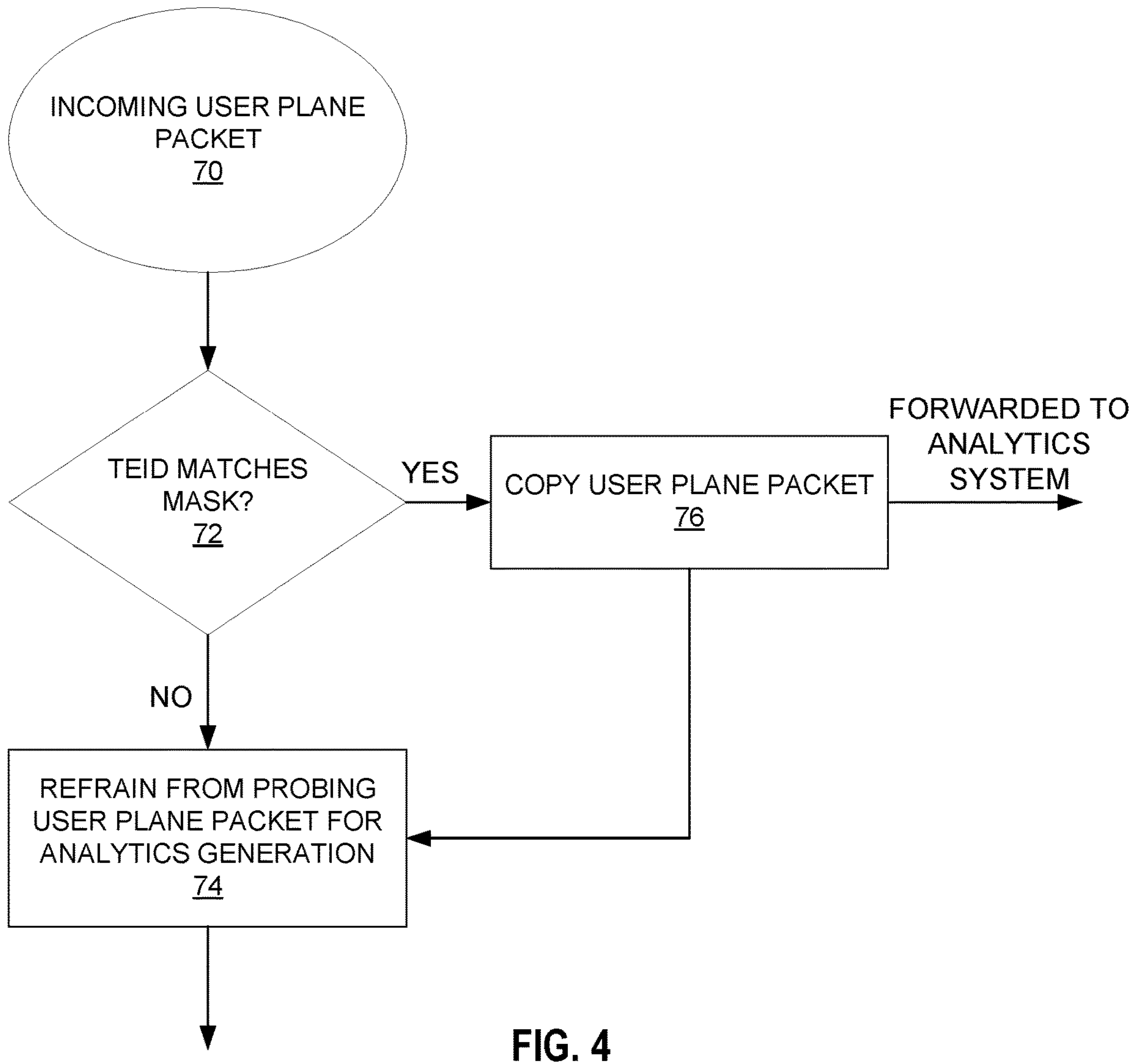
FIG. 4 is a logic flow diagram for user plane packet probing according to some embodiments.

FIG. 4 now illustrates additional details of user plane packet processing logic at the user plane probe 40 according to some embodiments that exploit a mask 42 for determining which user plane packets are to be probed for analytics generation. As shown in this regard, the user plane probe 40 receives an incoming user plane packet as communicated through a tunnel identified by a certain TEID (Step 70). This TEID may for instance be indicated in a header of the user plane packet. The user plane probe 40 applies the mask 42, e.g., in the form of a special bitmask, and determines whether the indicated TEID matches the mask 42 (Step 72). If the TEID does not match the mask 42 (NO at Step 72), the user plane probe 40 refrains from probing the user plane packet for analytics generation (Step 74). On the other hand, if the TEID does match the mask 42 (YES at Step 72), the user plane probe 40 probes the user plane packet for analytics generation. As shown in this regard, the user plane probe 40 may copy the user plane packet (Step 76) and forward the copied user plane packet to the analytics system 20.

Consider now an example implementation with reference to the components shown in FIG. 1 according to some embodiments. In this example, the TEID allocator 30 generates TEIDs that are unique, at least amongst TEIDs generated by the TEID allocator 30, i.e., the TEIDs in this example are non-fully qualified TEIDs. The TEID allocator 30 generates one subset of TEIDs that match the mask 42, such that those TEIDs belong to the analysis subset S1, and another subset of TEIDs that do not match the mask 42, such that those TEIDs belong to the non-analysis subset S2. In one embodiment, the analysis subset S1 and the non-analysis subset S2 comprise disjoint, non-overlapping ranges of TEIDs.

As one example of TEID generation in this regard, the TEID allocator 30 is configured with a TEID generator function denoted as gen-TEID*, which generates TEIDs to match a mask provided as input to the function. That is, gen-TEID*(Mask) generates a TEID that matches the provided Mask input parameter. In order to generate a TEID that matches the mask 42, the TEID allocator 30 calls gen-TEID*(Mask) with the mask 42 as the Mask input parameter. In order to generate a TEID that does not match the mask 42, the TEID allocator 30 calls gen-TEID*(Mask) with the bitwise negation of the mask 42 as the Mask input parameter. In algorithm form, then, the TEID allocator 30 may implement the below logic, where the Flag parameter is a boolean value indicating if the TEID is to match the mask 42 or is to not match the mask 42, i.e., if the TEID is to belong to the analysis subset S1 or the non-analysis subset S2.

```
IF Flag:
    return gen-TEID*(mask)
ELSE:
    return gen-TEID*(^mask) (Note: ^ means bitwise negation)
```

Note that, in some embodiments where analytics generation can be turned on or off, this is implemented as part of logic for deciding whether to generate TEIDs according to embodiments herein or according to a legacy approach that does not account for analytics generation. In this case, the TEID allocator 30 may implement the below logic:

```
IF analytics generation is turned on:
  IF Flag:
    return gen-TEID*(mask)
  ELSE:
    return gen-TEID*(^mask) (Note: ^ means bitwise
      negation)
ELSE:
  return gen-TEID( )
```

Here, gen-TEID( ) generates a TEID according to legacy approaches, without regard to any mask.

Note further that, in one or more embodiments, regardless of whether the TEID is generated based on a mask, the TEID generated is unique, either globally across all network nodes or non-globally at a single network node. Alternatively or additionally, the TEID generated may comply with one or more security requirements, e.g., specified by or from external sources such as 3GPP specifications.

Consider now an example implementation for how the user plane probe 40 may check if a TEID matches the mask 42. As shown below, the user plane probe 40 may generated a masked value by performing a bitwise AND operation of the TEID and the mask 42. If the resulting masked value equals the mask 42, the user plane probe 40 determines that the TEID matches the mask 42. If the resulting masked value does not equal the mask 42, the user plane probe 40 determines that the TEID does not match the mask 42.

```
masked value:=TEID & mask (Note: '&' denotes the
  bitwise AND operation.)
IF masked value=mask, THEN
  return TRUE (match)
ELSE
  return FALSE (no match)
```

The user plane probe 40 in other implementations, however, may use one or more other algorithms depending on the which bitwise operation is used and the condition checked after masking.

Some embodiments herein are applicable for Subscriber and Network Analytics (SNA) or Customer Experience Management (CEM) systems, which are part of the Network Management domain. Such systems monitor and analyze service and network quality on a subscriber level in mobile networks. SNA systems are used in Network Operation Centers (NOC) and Service Operation Centers (SOC) and by Network Optimization Engineering (Network Performance Management).

In some embodiments, such as where the communication network 10 is a 5G network, the analytics system 20 (e.g., in the form of a NWDAF) may allow consumers to request and get different types of analytics, e.g., in the form of analytics information or analytics events. The analytics may for instance include or characterize one or more of: slice load level information, network slice instance load level information, service experience, NF load, network performance, abnormal behavior, UE mobility, UE communication, user data congestion, or QoS sustainability.

In these and other embodiments, analytics may be generated based on network Key Performance Indicators (KPIs) monitored in a Network Operation Center of the communication network 10. The KPIs may be based on node and network events and/or counters. KPIs may be aggregated in time and/or for node or other dimensions, e.g. device type, service provider, etc. KPIs themselves can indicate node or network failures but are not themselves detailed enough for troubleshooting, and they are not themselves suitable for identifying end-to-end, user-perceived service quality issues. Instead, the KPIs may be analyzed, for use in generating analytics for these or other purposes.

In some embodiments, the analytics system 20 generates analytics based on collecting and correlating elementary network events from different network domains, such as packet core, radio and transport. The analytics system 20 in this regard may calculate user and session level end-to-end service quality metrics (e.g., Service Key Performance Indicators, S-KPIs) as well as radio and network resource (e.g., Resource Key Performance Indicators, R- - -KPIs), characterizing radio environment or network operation at the user and session level. The analytics may therefore be suitable for session-based troubleshooting and analysis of network issues. The analytics may alternatively or additionally be usable for monitoring the quality of a wide variety of services used at the network level, and/or for monitoring the customer experience on an individual per subscriber level. Regardless, event-based analytics in these embodiments may require real-time collection and correlation of characteristic node and protocol events from different radio and core nodes, probing signaling interfaces and sampling of the user-plane traffic as well. Beside the data collection and correlation functions, the analytics system 20 may include an advanced database, a rule engine, and/or a big data analytics platform. Especially where the communication network 10 is a 5G network, the communication network 10 may serve (and provide quality of service, quality of experience) a large variety of service types as well as serve a high number of devices. The incoming event rate and type to be processed by the analytics system 20 may therefore be high.

To reduce hardware requirements for monitoring, the analytics system 20 may provide sampling and/or filtering configurations, e.g., towards the SMF and UPF, for sampling and/or filtering which user plane traffic is to be processed for analytics generation. This may be done through a proprietary or REST interface, or through standard configuration protocols, like Netconf. Sampling refers to a random selection of a well-defined fraction of the user plane sessions, while filtering refers to a selection of user plane sessions based on a white list. These selected sessions will be referred as monitored sessions. A sampling configuration may consist of, at least, the ratio of SUPIs to be monitored, e.g. 10%, which means that that 10% of randomly selected SUPIs should be monitored. The random selection may be done with a consistent hash function in the different network nodes or network functions in order to ensure the generation of the analytics events for the same random set of SUPIs. By contrast, a filtering configuration consists of, at least, the list of SUPIs to be monitored, which is also called white list. Regardless, sampling and filtering means that certain sessions of the user plane traffic need additional processing to provide an analytics system with data about those sessions (e.g., certain service or quality KPIs need to be measured for some of the user plane sessions).

Some embodiments enable the analytics system 10 to receive monitoring events belonging to the same session, e.g., when sessions are filtered or sampled. In signaling entities, SUPI or other session identifiers are directly available for filtering and sampling; however, in the user plane data flow this information is not directly available. Correlating the user plane traffic to SUPI would require high processing capacity and, due to the control-user plane separation, the correlation information is not available locally.

In this context, some embodiments efficiently sample or filter the user plane traffic at the UPF for user plane analytics using a F-TEID in special way. Based on the use cases the analytics system 20 may identify what user plane traffic should be monitored, i.e., for analytics generation. In some embodiments, the analytics system 20 identifies the user plane traffic to be monitored on a session by session basis.

In some embodiments, each time a F-TEID is generated (e.g., a new GTP-U tunnel is created), the TEID allocator 30 checks whether the corresponding session needs to be monitored or not. The set of potential identifier values is divided into two disjoint subsets: one for monitoring and the other one for no monitoring. The TEID allocator 30 makes sure that the new identifier is picked from the right subset. F-TEID generation may be performed in this way for both uplink and downlink traffic directions.

In the UPF, for each data packet (e.g., GTP-U packet), the user plane probe 40 checks the identifier present in the packet header. Based on that identifier, the user plane probe 40 decides whether the packet belongs to a session that is to be monitored. If yes, the necessary extra processing required for monitoring takes place for the packet.

In some embodiments, the two subsets of the potential identifier values are selected in a way which ensures efficient decision making (low processing time and/or capacity) if an identifier falls or not into the monitoring set (e.g. by comparing to a mask).

Generally, then, some embodiments herein modify TEID generation in a way that enables the UPF to efficiently decide if a user plane packet needs extra processing for analytics or KPI generation purposes. Embodiments herein correspondingly include TEID generation at a CN node and/or an AN node for uplink and/or downlink traffic directions. Some embodiments contemplate TEID generation by the SMF or the UPF.

Certain embodiments may provide one or more of the following technical advantage(s). Using the above TEID-based approach, some embodiments herein efficiently implement subscriber-consistent sampling and filtering of user plane traffic for analytics purposes. In some embodiments, the TEID generation approach is consistent with standardized procedures, meaning that it can be implemented as a vendor-specific extension. Some embodiments herein facilitate efficient analytics generation. Indeed, the performance critical point in analytics generation is the user plane packet processing, and some embodiments herein that exploit a mask 42 may require only a constant time check (few clock-cycles) to decide which user plane packets need extra processing for analytics generation. Some embodiments alternatively or additionally facilitate low footprint, yet high value, analytics systems by enabling sampling and filtering implementations in such systems.

Some embodiments in this regard exploit tunnel endpoints which have unique identifiers (F-TEID) included in the headers of the packets in the user plane traffic. In 5G networks, the AN-side TEIDs are generated by e/gNB nodes, while CN-side TEIDs are generated by the SMF or UPF nodes. These entities are free to choose arbitrary values for the TEIDs, given that the generated identifiers are unique (globally or within some context). Sessions may include multiple GTP-U tunnels.

In particular, some embodiments allocate TEIDs in special way, for facilitating analytics generation from selected user plane traffic. By using special TEIDs, at the CN-side and/or the AN-side, for sessions that need monitoring, some embodiments ensure that it is efficient to decide for uplink and/or downlink packets if they need to be monitored or not, on a packet level, in a state-less way.

Note that, in a 5G network, the analytics system 20 may not directly communicate with the SMF. There may be a component in the core network responsible for the control of the user plane probe 40. Such a component may provide a northbound interface that the analytics system 20 can use.

Figure 5:
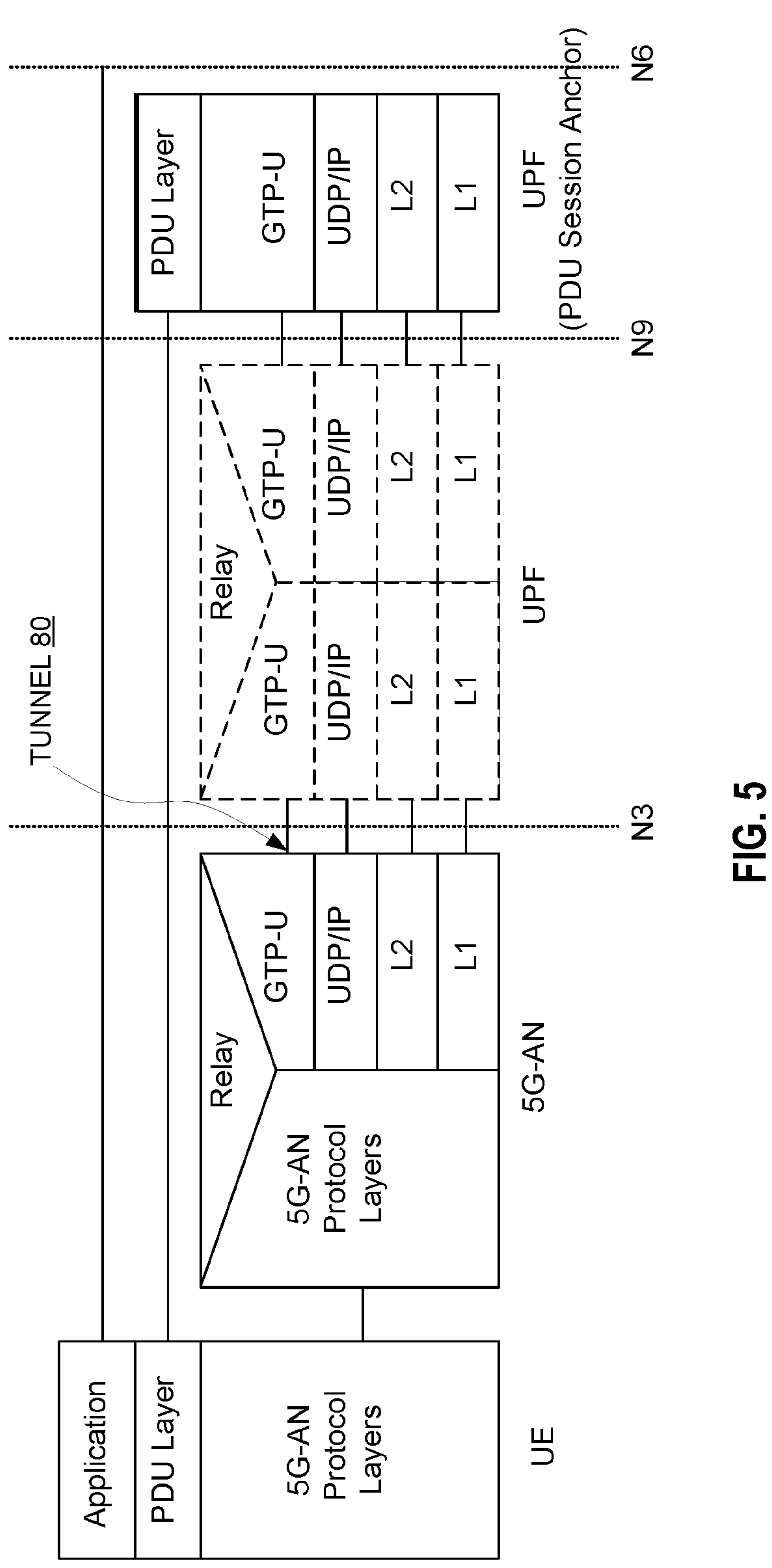
FIG. 5 is a block diagram of a user plane protocol stack according to some embodiments.

FIG. 5 shows one example in a context where the communication network 10 is a 5G network. As shown, a Packet Data Unit (PDU) layer is established, below the application layer, between a UE and a PDU session anchor, e.g., at the UPF. The PDU layer corresponds to a PDU carried between a UE and a data network (DN) over a PDU Session. When the PDU Session Type is IPV4 or IPV6 or IPv4v6, the PDU layer corresponds to IPv4 packets or IPV6 packets or both of them; When the PDU Session Type is Ethernet, the PDU layer corresponds to Ethernet frames.

The GPRS Tunnelling Protocol for the user plane (GTP-U) supports tunnelling user data over N3 (i.e. between the 5G-AN node and the UPF) and N9 (i.e. between different UPFs of the 5GC) in the backbone network. See, e.g., 3GPP TS 29.281. GTP shall encapsulate all end user PDUs. It provides encapsulation on a per PDU Session level. In some embodiments, tunnels T1, T2, and T3 as described in FIG. 1 are GTP-U tunnels.

Figure 6:
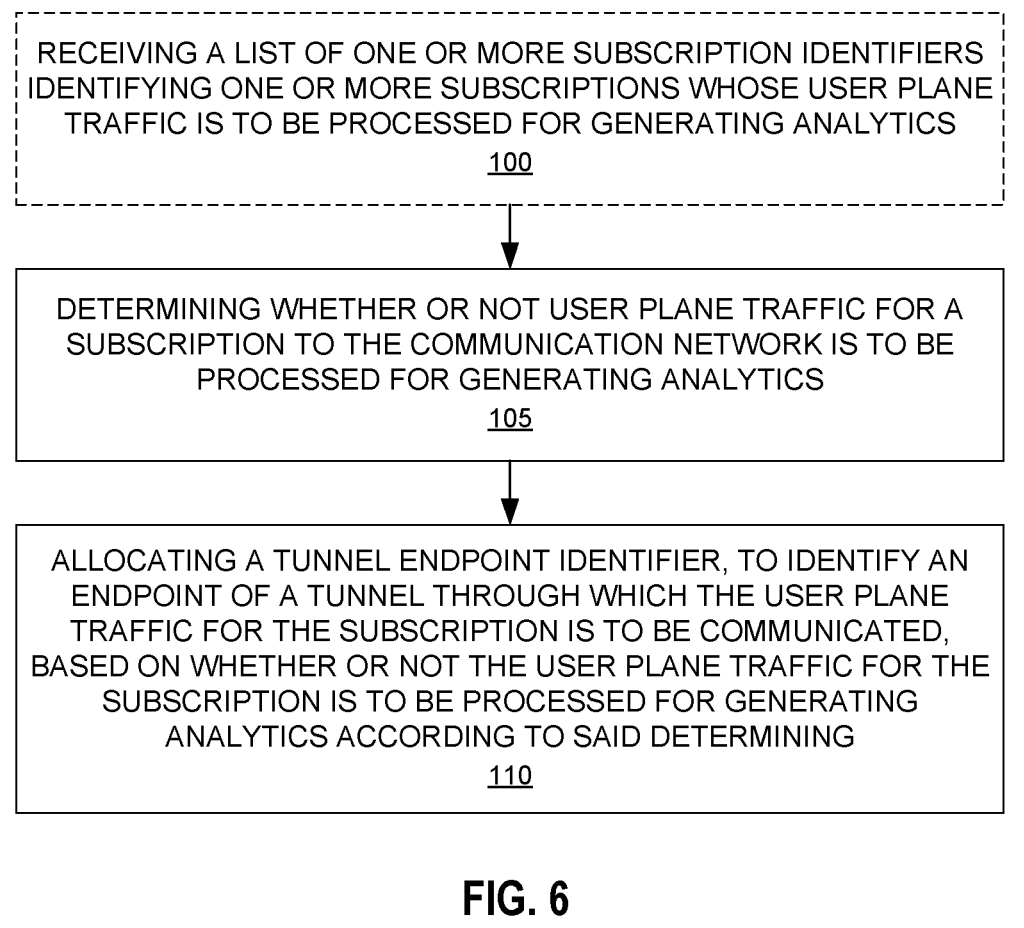

In view of the modifications and variations herein, FIG. 6 depicts a method performed by a network node in a communication network 10 for implementing TEID allocator 30 according to some embodiments. The network node that implements the TEID allocator 30 may be network node 10-1, network node 10-2, or any other network node in the communication network 10. The method includes determining whether or not user plane traffic (P1, P2, or P3) for a subscription (14A, 14B, or 14C) to the communication network 10 is to be processed for generating analytics (Block 105). The method further comprises allocating a tunnel endpoint identifier (TEID 1 2, or 3), to identify an endpoint (E1, E2, E3) of a tunnel (T1, T2, or T3) through which the user plane traffic (P1, P2, or P3) for the subscription (14A, 14B, or 14C) is to be communicated, based on whether or not the user plane traffic (P1, P2, or P3) for the subscription (14A, 14B, or 14C) is to be processed for generating analytics according to that determination (Block 110).

In some embodiments, allocating a tunnel endpoint identifier (TEID 1, 2, or 3) comprises allocating the tunnel endpoint identifier (TEID 1, 2, or 3) from a first subset S1 of tunnel endpoint identifiers or a second subset S2 of tunnel endpoint identifiers, depending respectively on whether or not the user plane traffic (P1, P2, or P3) for the subscription (14A, 14B, or 14C) is to be processed for generating analytics. In this case, the first subset S1 of tunnel endpoint identifiers is dedicated for user plane traffic (P1, P2, or P3) that is to be processed for generating analytics, and the second subset S2 of tunnel endpoint identifiers is dedicated for user plane traffic (P1, P2, or P3) that is not to be processed for generating analytics.

In some embodiments, the method further comprises receiving a list 32 of one or more subscription identifiers identifying one or more subscriptions (14A, 14B, or 14C) whose user plane traffic (P1, P2, or P3) is to be processed for generating analytics (Block 100). In this case, the determination comprises determining whether or not a subscription identifier identifying the subscription (14A, 14B, or 14C) is included in the received list 32.

In some embodiments, the network node 10-1, 10-2 implements a session management function, SMF, or a user plane function, UPF.

In some embodiments, the tunnel endpoint identifier (TEID 1, 2, or 3) is a first tunnel endpoint identifier that identifies an endpoint (E1, E2, E3) of a first tunnel through which the user plane traffic (P1, P2, or P3) for the subscription (14A, 14B, 14C) is to be communicated in a first direction. In this case, the method further comprises receiving a second tunnel endpoint identifier that identifies an endpoint (E1, E2, E3) of a second tunnel through which the user plane traffic (P1, P2, or P3) for the subscription (14A, 14B, 14C) is to be communicated in a second direction, and said determining comprises determining whether or not user plane traffic (P1, P2, or P3) for the subscription (14A, 14B, 14C) to the communication network 10 is to be processed for generating analytics depending respectively on whether or not the second tunnel endpoint identifier is included in a subset of tunnel endpoint identifiers dedicated for user plane traffic (P1, P2, or P3) that is to be processed for generating analytics. In one or more of these embodiments, the network node 10-1, 10-2 is an access network node in an access network of the communication network 10.

In some embodiments, the tunnel (T1, T2, or T3) has one endpoint (E1, E2, E3) at a core network node of the communication network 10 and one endpoint (E1, E2, E3) at an access network node of the communication network 10. In one or more of these embodiments, the network node 10-1, 10-2 is either the core network node or the access network node.

In some embodiments, the tunnel (T1, T2, or T3) is a General Packet Radio Service, GPRS, Tunnelling Protocol, GTP, user plane tunnel.

In some embodiments, the method further comprises transmitting, as part of a procedure for establishing or modifying a user plane session for the user plane traffic (P1, P2, or P3), a message that indicates the allocated tunnel endpoint identifier (TEID 1, 2, or 3).

In some embodiments, the analytics characterize service quality and/or network quality on a subscription level. Additionally or alternatively, the analytics are based on collection and correlation of elementary network events from different network domains.

Figure 7:
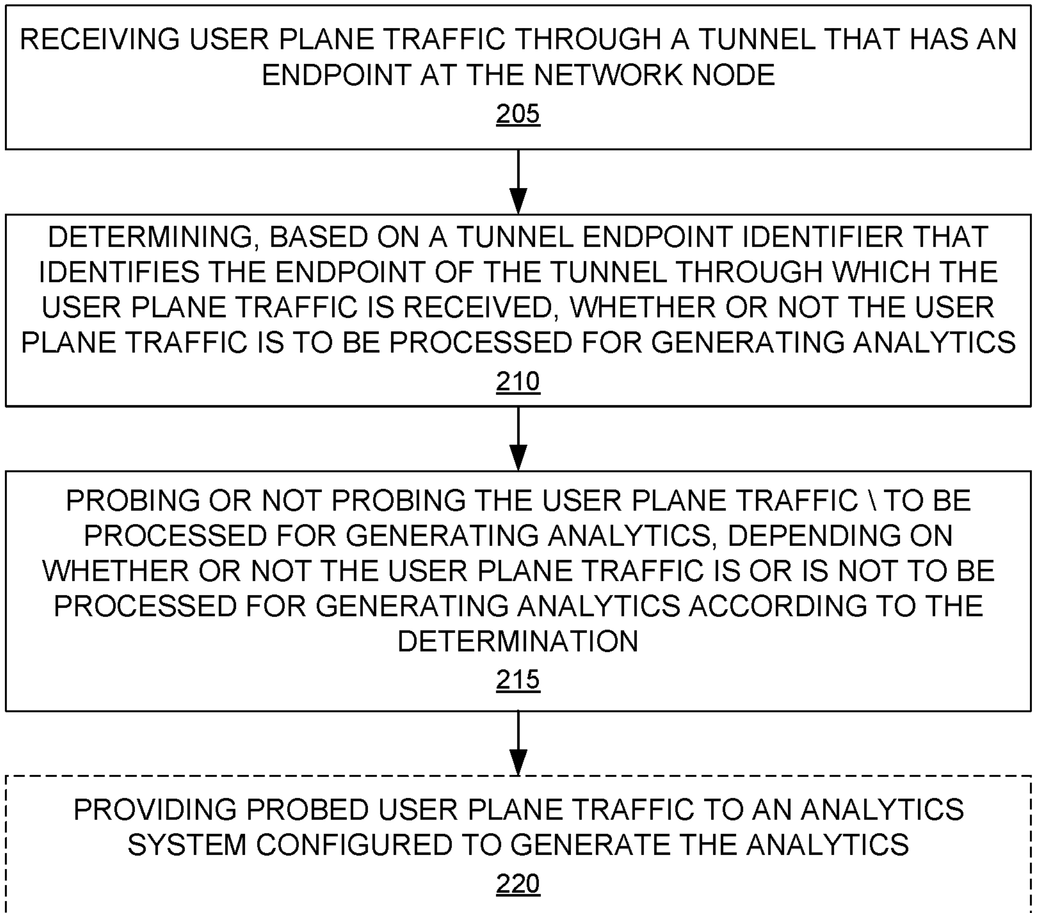
FIG. 7 is a logic flow diagram of a method performed by a network node according to other embodiments.

FIG. 7 shows a method performed by a network node in a communication network 10 for implementing a user plane probe 40 according to some embodiments. The network node may for instance be the network node that implements a user plane function (UPF). The network node may accordingly be whichever of network node 10-1 or network node 10-2 is in a core network of the communication network 10 in some embodiments. Regardless, the method includes receiving user plane traffic (P1, P2, or P3) through a tunnel (T1, T2, or T3) that has an endpoint (E1, E2, E3) at the network node (Block 205). The method further comprises determining, based on a tunnel endpoint identifier that identifies the endpoint (E1, E2, E3) of the tunnel (T1, T2, or T3) through which the user plane traffic (P1, P2, or P3) is received, whether or not the user plane traffic (P1, P2, or P3) is to be processed for generating analytics (Block 210). The method also comprises probing or not probing the user plane traffic (P1, P2, or P3) to be processed for generating analytics, depending on whether or not the user plane traffic (P1, P2, or P3) is or is not to be processed for generating analytics according to the determination (Block 215).

In some embodiments, said determining comprises determining that the user plane traffic (P1, P2, or P3) is or is not to be processed for generating analytics depending respectively on whether the tunnel endpoint identifier (TEID 1, 2, or 3) is included in a first subset S1 of tunnel endpoint identifiers or a second subset S2 of tunnel endpoint identifiers. In this case, the first subset S1 of tunnel endpoint identifiers is dedicated for user plane traffic (P1, P2, or P3) that is to be processed for generating analytics, and the second subset S2 of tunnel endpoint identifiers is dedicated for user plane traffic (P1, P2, or P3) that is not to be processed for generating analytics.

In some embodiments, said determining comprises applying a mask 42 to the tunnel endpoint identifier (TEID 1, 2, or 3), and determining, based on whether or not the tunnel endpoint identifier (TEID 1, 2, or 3) matches the mask 42, whether or not the user plane traffic (P1, P2, or P3) is to be processed for generating analytics.

In some embodiments, the network node implements, or is co-located with, a user plane function, UPF.

In some embodiments, the tunnel (T1, T2, or T3) has another endpoint (E1, E2, E3) at an access network node of the communication network 10.

In some embodiments, the tunnel (T1, T2, or T3) is a General Packet Radio Service, GPRS, Tunnelling Protocol, GTP, user plane tunnel.

In some embodiments, the method further comprises providing probed user plane traffic (P1, P2, or P3) to an analytics system 20 configured to generate the analytics (Block 220).

In some embodiments, the analytics characterize service quality and/or network quality on a subscription level. Additionally or alternatively, the analytics are based on collection and correlation of elementary network events from different network domains.

Embodiments herein also include corresponding apparatuses. Embodiments herein for instance include a network node configured to perform any of the steps of any of the embodiments described above for the TEID allocator 30 and/or the user plane probe 40.

Embodiments also include a network node comprising processing circuitry and power supply circuitry. The processing circuitry is configured to perform any of the steps of any of the embodiments described above for the TEID allocator 30 and/or the user plane probe 40. The power supply circuitry is configured to supply power to the network node.

Embodiments further include a network node comprising processing circuitry. The processing circuitry is configured to perform any of the steps of any of the embodiments described above for the TEID allocator 30 and/or the user plane probe 40. In some embodiments, the network node further comprises communication circuitry.

Embodiments further include a network node comprising processing circuitry and memory. The memory contains instructions executable by the processing circuitry whereby the network node is configured to perform any of the steps of any of the embodiments described above for the TEID allocator 30 and/or the user plane probe 40.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
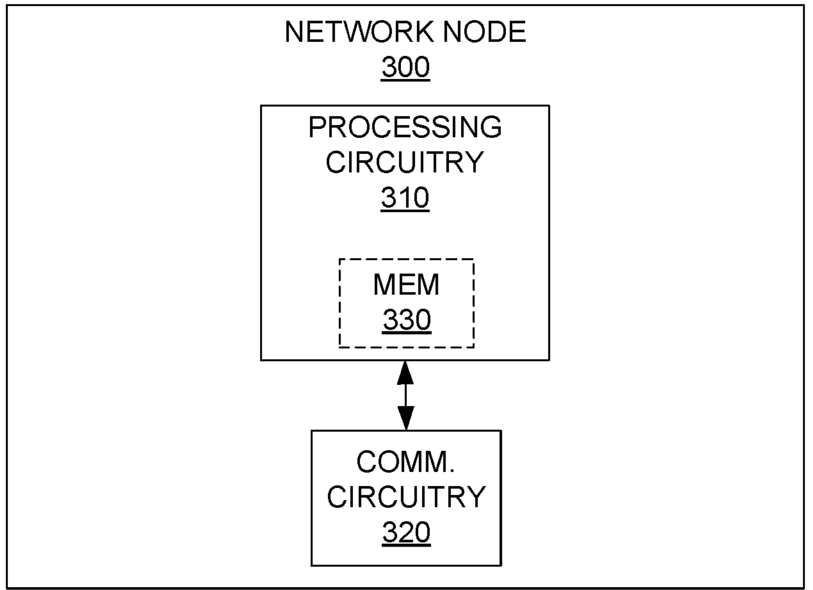
FIG. 8 is a block diagram of a network node according to some embodiments.

FIG. 8 illustrates a network node 300 that implements TEID allocator 30 in accordance with one or more embodiments. The network node 300 may for instance be network node 10-1, network node 10-2, or any other network node in the communication network 10. As shown, the network node 300 includes processing circuitry 310 and communication circuitry 320. The communication circuitry 320 is configured to transmit and/or receive information to and/or from one or more other nodes, e.g., via any communication technology. The processing circuitry 310 is configured to perform processing described above for TEID allocator 30, e.g., in FIG. 6, such as by executing instructions stored in memory 330. The processing circuitry 310 in this regard may implement certain functional means, units, or modules.

Figure 9:
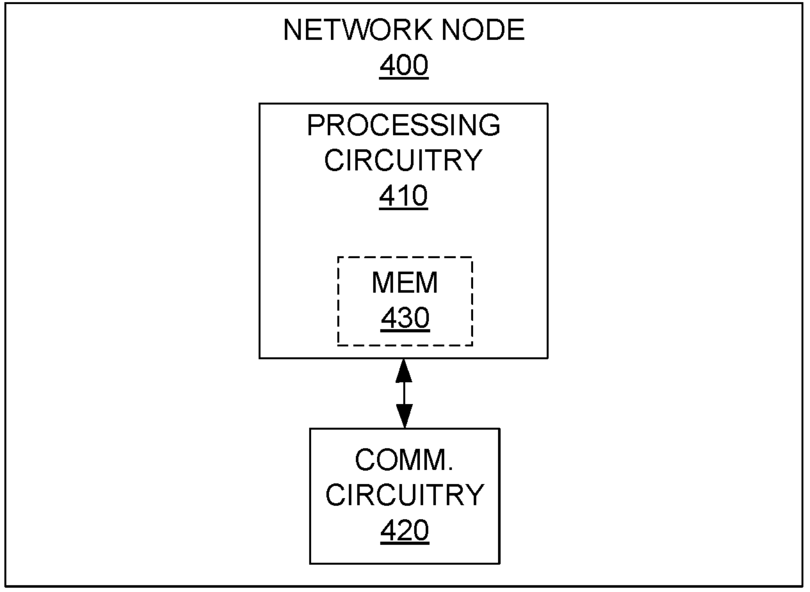
FIG. 9 is a block diagram of a network node according to other embodiments.

FIG. 9 illustrates a network node 400 that implements user plane probe 40 in accordance with one or more embodiments. The network node 400 may for instance be network node 10-1, network node 10-2, or any other network node in a core network of the communication network 10. As shown, the network node 400 includes processing circuitry 410 and communication circuitry 420. The communication circuitry 420 is configured to transmit and/or receive information to and/or from one or more other nodes, e.g., via any communication technology. The processing circuitry 410 is configured to perform processing described above for user plane probe 40 e.g., in FIG. 7, such as by executing instructions stored in memory 430. The processing circuitry 410 in this regard may implement certain functional means, units, or modules.

Those skilled in the art will also appreciate that embodiments herein further include corresponding computer programs.

A computer program comprises instructions which, when executed on at least one processor of a network node, cause the network node to carry out any of the respective processing described above, e.g., in FIG. 6 or FIG. 7. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 10:
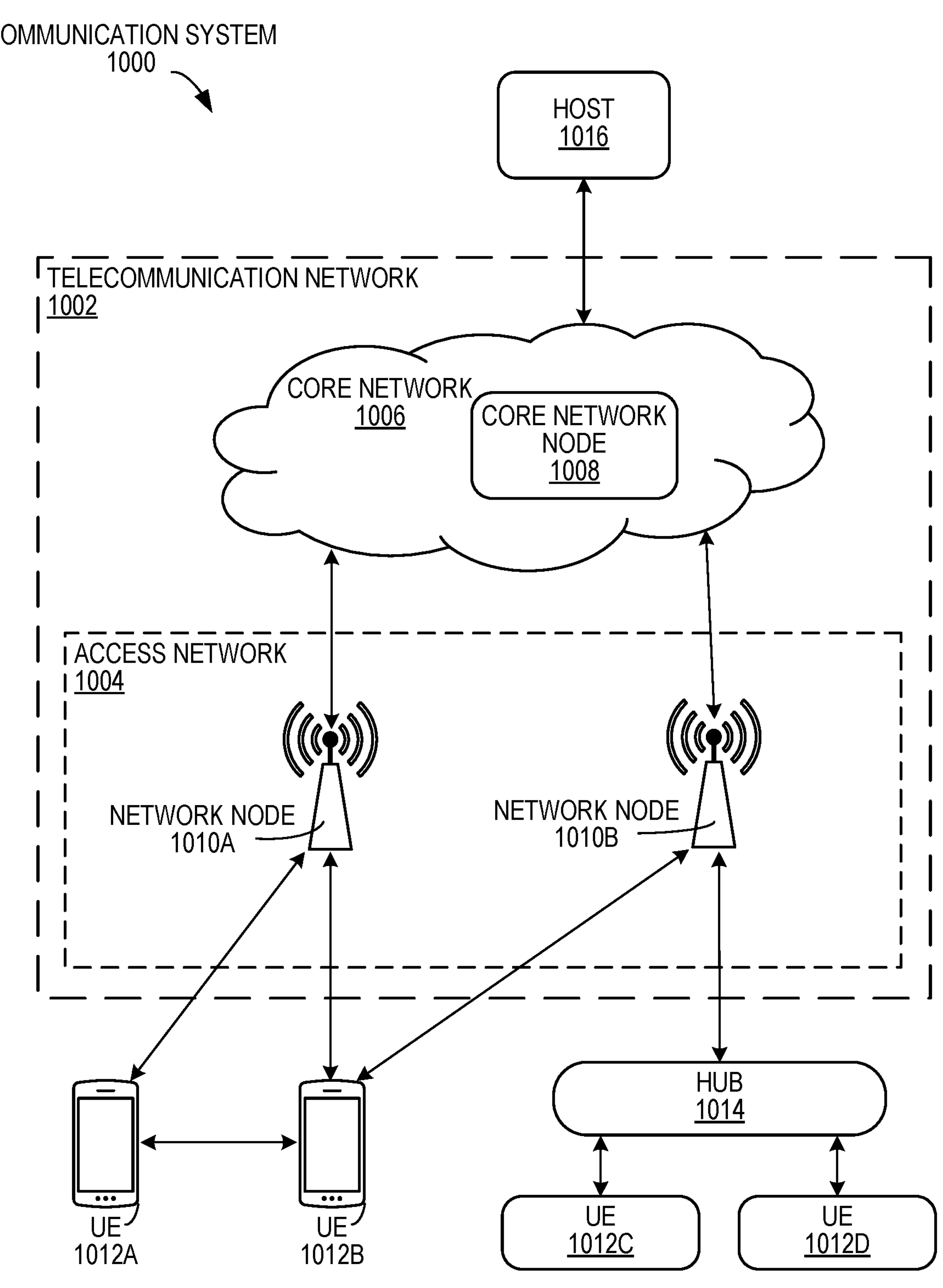
FIG. 10 is a block diagram of a communication system in accordance with some embodiments

FIG. 10 shows an example of a communication system 1000 in accordance with some embodiments.

In the example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010*a* and 1010*b* (one or more of which may be generally referred to as network nodes 1010), or any other similar 3rd Generation Partnership Project (3GPP) access node or non-3GPP access point. The network nodes 1010 facilitate direct or indirect connection of user equipment (UE), such as by connecting UEs 1012*a*, 1012*b*, 1012*c*, and 1012*d* (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002, and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G): wireless local area network (WLAN) standards, such as the Institute of Electrical and Electronics Engineers (IEEE) 802.11 standards (WIFI); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single-or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012*c* and/or 1012*d*) and network nodes (e.g., network node 1010*b*). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010*b*. The hub 1014 may also allow for a different communication scheme and/or schedule between the hub 1014 and UEs (e.g., UE 1012*c* and/or 1012*d*), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010*b*. In other embodiments, the hub 1014 may be a non-dedicated hub—that is, a device which is capable of operating to route communications between the UEs and network node 1010*b*, but which is additionally capable of operating as a communication start and/or end point for certain data channels.

Figure 11:
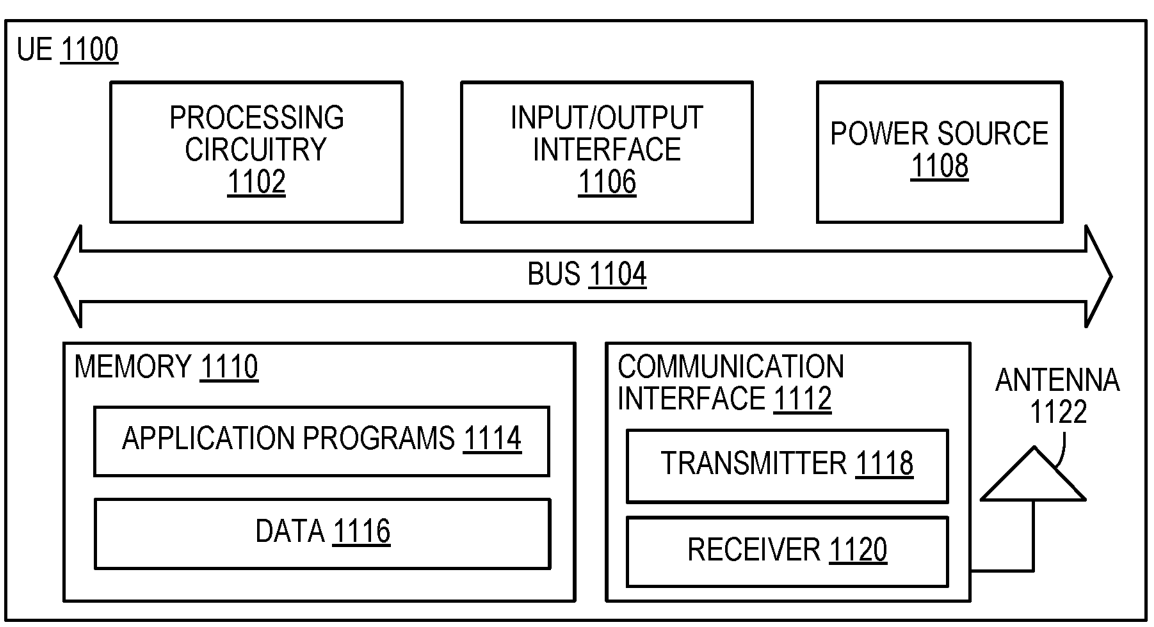
FIG. 11 is a block diagram of a user equipment according to some embodiments.

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V21), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal-or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
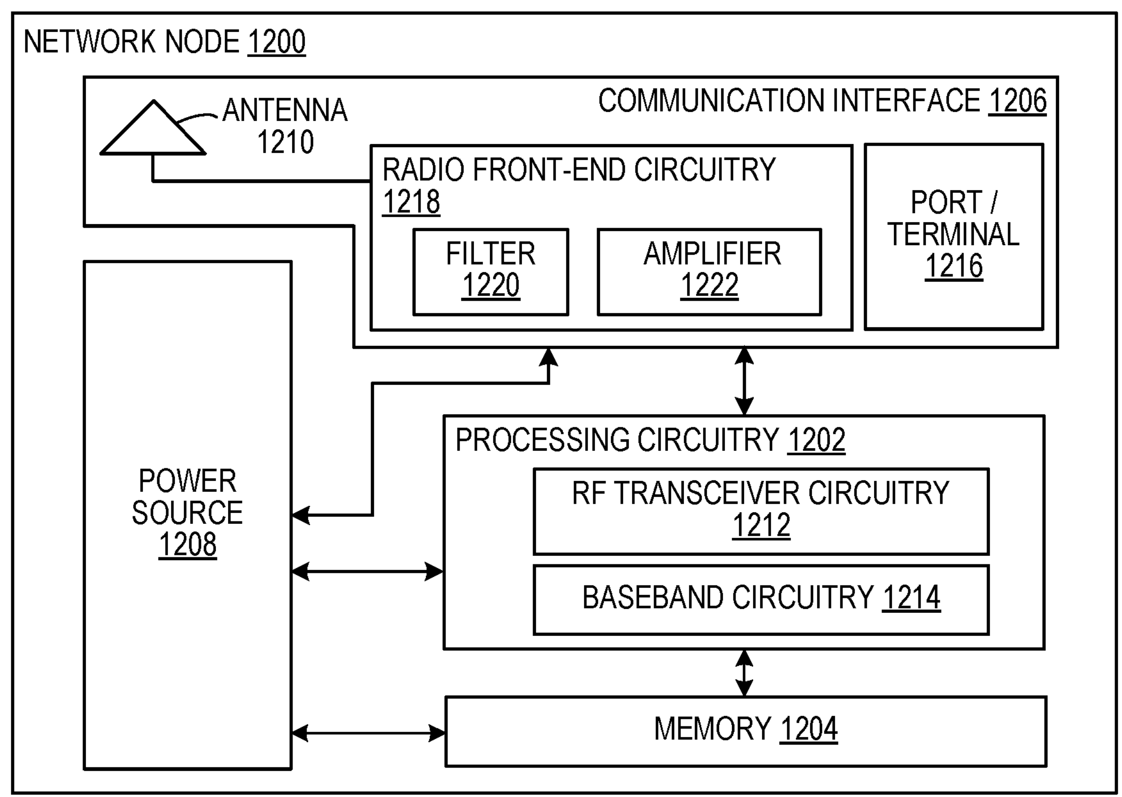
FIG. 12 is a block diagram of a network node according to some embodiments.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
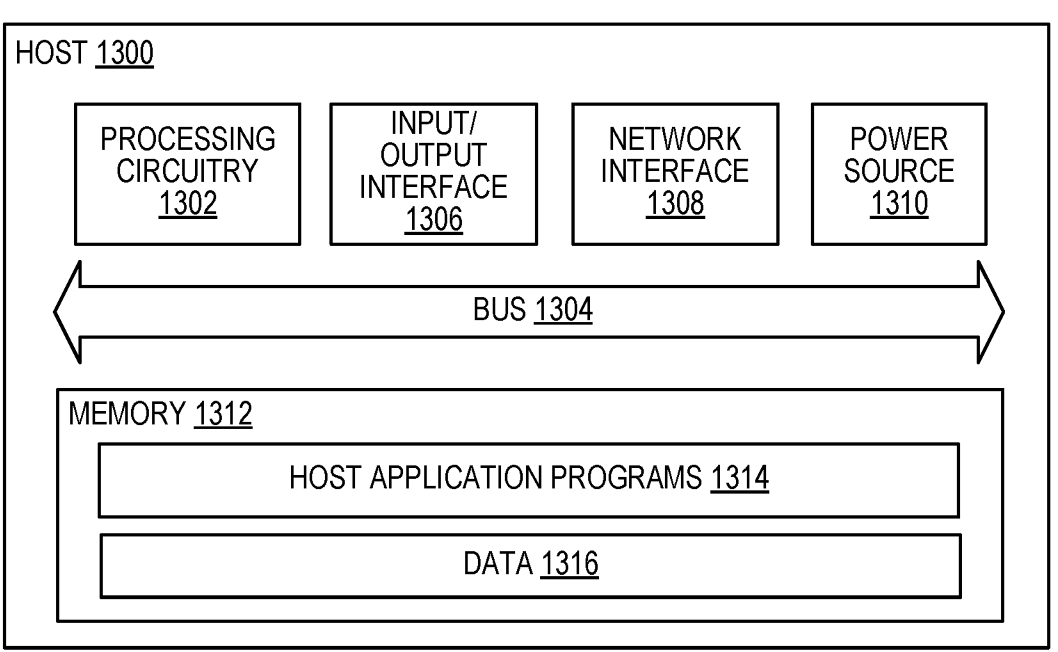
FIG. 13 is a block diagram of a host according to some embodiments.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
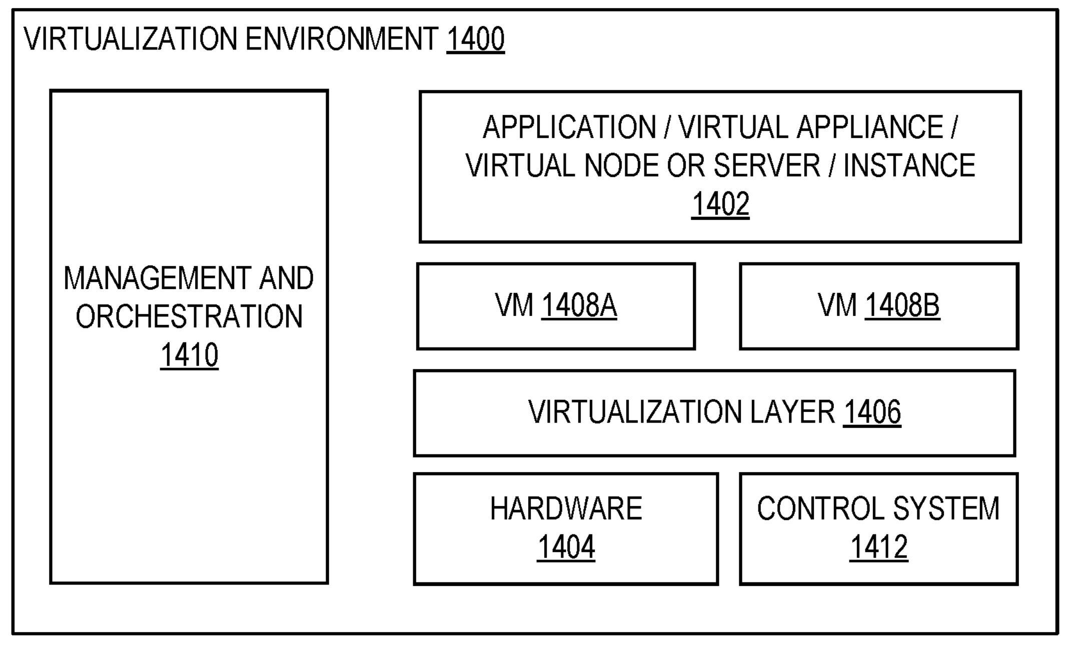
FIG. 14 is a block diagram of a virtualization environment according to some embodiments.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1404 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408*a* and 1408*b* (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g. such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

Figure 15:
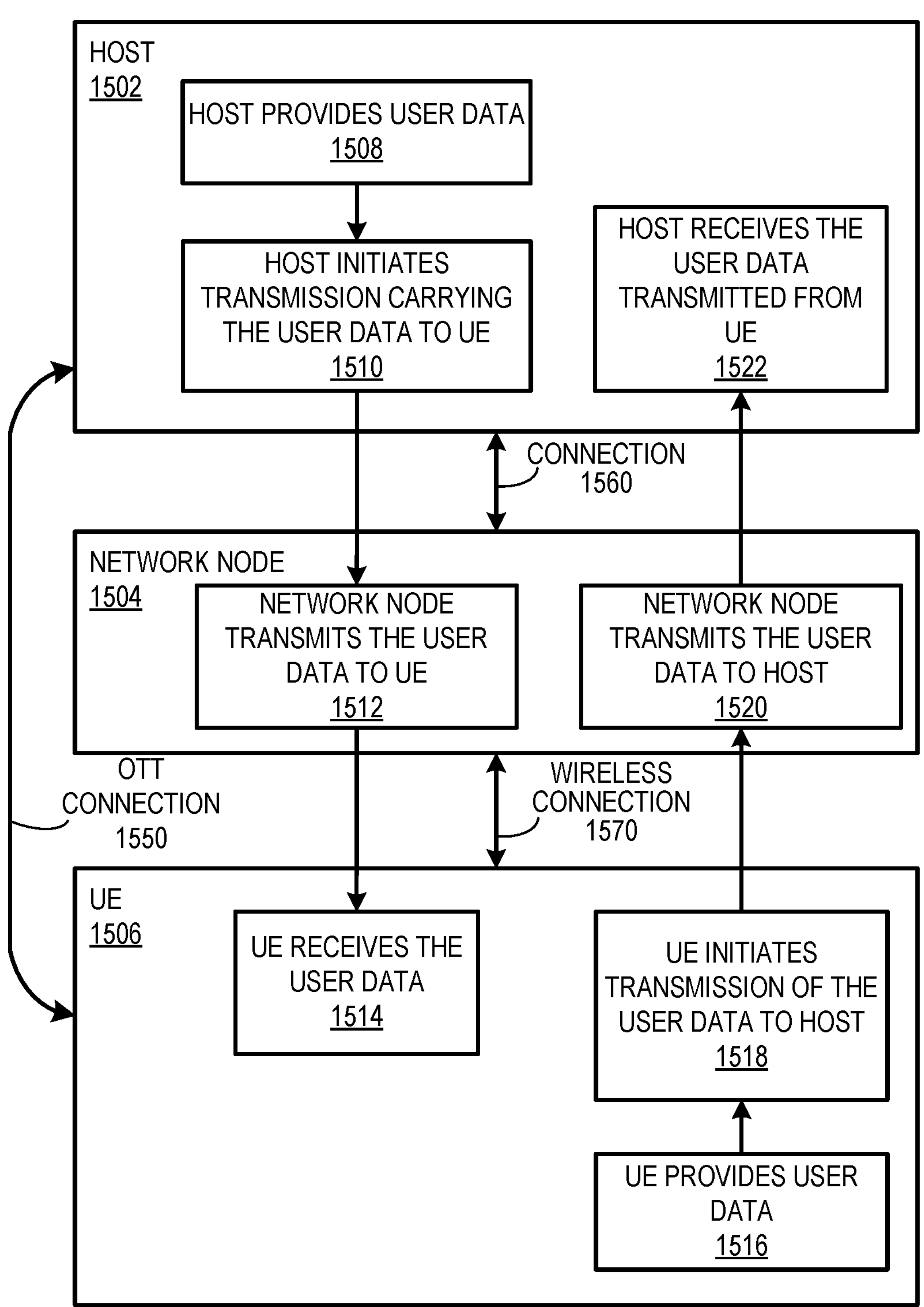
FIG. 15 is a block diagram of a host communicating via a network node with a UE over a partially wireless connection in accordance with some embodiments.

FIG. 15 shows a communication diagram of a host 1502 communicating via a network node 1504 with a UE 1506 over a partially wireless connection in accordance with some embodiments. Example implementations, in accordance with various embodiments, of the UE (such as a UE 1012*a* of FIG. 10 and/or UE 1100 of FIG. 11), network node (such as network node 1010*a* of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

One or more of the various embodiments improve the performance of OTT services provided to the UE 1506 using the OTT connection 1550, in which the wireless connection 1570 forms the last segment.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes; the sensors may participate in the measurement procedure by supplying values of the monitored quantities exemplified above, or supplying values of other physical quantities from which software may compute or estimate the monitored quantities. The reconfiguring of the OTT connection 1550 may include message format, retransmission settings, preferred routing etc.; the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a network node in a communication network, the method comprising:

determining whether or not user plane traffic for a subscription to the communication network is to be processed for generating analytics; and allocating a tunnel endpoint identifier to identify an endpoint of a tunnel through which the user plane traffic for the subscription is to be communicated based on whether or not the user plane traffic for the subscription is to be processed for generating analytics according to the determining, the tunnel endpoint identifier being a first tunnel endpoint identifier that identifies an endpoint of a first tunnel through which the user plane traffic for the subscription is to be communicated in a first direction;

receiving a second tunnel endpoint identifier that identifies an endpoint of a second tunnel through which the user plane traffic for the subscription is to be communicated in a second direction, and the determining comprising determining whether or not user plane traffic for the subscription to the communication network is to be processed for generating analytics depending respectively on whether or not the second tunnel endpoint identifier is included in a subset of tunnel endpoint identifiers dedicated for user plane traffic that is to be processed for generating analytics.

2. The method of claim 1, wherein the allocating comprises allocating the tunnel endpoint identifier from a first subset of tunnel endpoint identifiers or a second subset of tunnel endpoint identifiers, depending respectively on whether or not the user plane traffic for the subscription is to be processed for generating analytics, wherein the first subset of tunnel endpoint identifiers is dedicated for user plane traffic that is to be processed for generating analytics, and wherein the second subset of tunnel endpoint identifiers is dedicated for user plane traffic that is not to be processed for generating analytics.

3. The method of claim 1, further comprising receiving a list of one or more subscription identifiers identifying one or more subscriptions whose user plane traffic is to be processed for generating analytics, and wherein the determining comprises determining whether or not a subscription identifier identifying the subscription is included in the received list.

4. The method of claim 1, wherein the network node implements a session management function, SMF, or a user plane function, UPF.

5. The method of claim 1, wherein the network node is an access network node in an access network of the communication network.

6. The method of claim 1, wherein the tunnel has one endpoint at a core network node of the communication network and one endpoint at an access network node of the communication network.

7. The method of claim 6, wherein the network node is either the core network node or the access network node.

8. The method of claim 1, wherein the tunnel is a General Packet Radio Service, GPRS, Tunnelling Protocol, GTP, user plane tunnel.

9. The method of claim 1, further comprising transmitting, as part of a procedure for establishing or modifying a user plane session for the user plane traffic, a message that indicates the allocated tunnel endpoint identifier.

10. The method of claim 1, wherein the analytics one or both:

characterize one or both service quality and network quality on a subscription level; and are based on collection and correlation of elementary network events from different network domains.

11. A network node configured for use in a communication network, the network node configured to:

determine whether or not user plane traffic for a subscription to the communication network is to be processed for generating analytics; and allocate a tunnel endpoint identifier, to identify an endpoint of a tunnel through which the user plane traffic for the subscription is to be communicated, based on whether or not the user plane traffic for the subscription is to be processed for generating analytics according to the determining, the tunnel endpoint identifier being a first tunnel endpoint identifier that identifies an endpoint of a first tunnel through which the user plane traffic for the subscription is to be communicated in a first direction;

receive a second tunnel endpoint identifier that identifies an endpoint of a second tunnel through which the user plane traffic for the subscription is to be communicated in a second direction; and being configured to determine whether or not user plane traffic for the subscription to the communication network is to be processed for generating analytics depends respectively on whether or not the second tunnel endpoint identifier is included in a subset of tunnel endpoint identifiers dedicated for user plane traffic that is to be processed for generating analytics.

12. A non-transitory computer storage medium storing a computer program comprising instructions which, when executed by at least one processor of a network node causes the network node to perform the method, the method comprising:

determining whether or not user plane traffic for a subscription to the communication network is to be processed for generating analytics; and allocating a tunnel endpoint identifier to identify an endpoint of a tunnel through which the user plane traffic for the subscription is to be communicated based on whether or not the user plane traffic for the subscription is to be processed for generating analytics according to the determining, the tunnel endpoint identifier being a first tunnel endpoint identifier that identifies an endpoint of a first tunnel through which the user plane traffic for the subscription is to be communicated in a first direction;

receiving a second tunnel endpoint identifier that identifies an endpoint of a second tunnel through which the user plane traffic for the subscription is to be communicated in a second direction, and the determining comprising determining whether or not user plane traffic for the subscription to the communication network is to be processed for generating analytics depending respectively on whether or not the second tunnel endpoint identifier is included in a subset of tunnel endpoint identifiers dedicated for user plane traffic that is to be processed for generating analytics.

* * * * *